(12) United States Patent
Kim

(10) Patent No.: US 11,718,900 B2
(45) Date of Patent: *Aug. 8, 2023

(54) IRON-BASED ALLOY POWDER AND MOLDED ARTICLE USING SAME

(71) Applicant: ATTOMETAL TECH PTE. LTD., Singapore (SG)

(72) Inventor: Choongnyun Paul Kim, Seoul (KR)

(*) Notice: Subject to any disclaimer, the term of this patent is extended or adjusted under 35 U.S.C. 154(b) by 216 days.

This patent is subject to a terminal disclaimer.

(21) Appl. No.: 17/257,572

(22) PCT Filed: Jul. 11, 2019

(86) PCT No.: PCT/KR2019/008571
§ 371 (c)(1),
(2) Date: Jan. 2, 2021

(87) PCT Pub. No.: WO2020/013632
PCT Pub. Date: Jan. 16, 2020

(65) Prior Publication Data
US 2021/0317552 A1  Oct. 14, 2021

(30) Foreign Application Priority Data
Jul. 11, 2018  (SG) .............................. 10201805971S

(51) Int. Cl.
*C22C 33/02* (2006.01)
*A63B 53/04* (2015.01)
(Continued)

(52) U.S. Cl.
CPC ........ *C22C 33/0285* (2013.01); *A63B 53/047* (2013.01); *B05D 7/14* (2013.01);
(Continued)

(58) Field of Classification Search
CPC .................................................. C22C 45/008
See application file for complete search history.

(56) References Cited

U.S. PATENT DOCUMENTS 4,822,415 A   4/1989  Dorfman
5,368,659 A  11/1994  Peker
(Continued)

FOREIGN PATENT DOCUMENTS

CN        1122148 A     5/1996
CN      101061246 A    10/2007
(Continued)

OTHER PUBLICATIONS

Zhou, Y.-Y. et al., Fabrication and characterization of supersonic plasma sprayed Fe-based amorphous metallic coatings. Materials and Design, Aug. 3, 2016, vol. 110, pp. 332-339.
(Continued)

*Primary Examiner* — Christopher S Kessler
(74) *Attorney, Agent, or Firm* — Harvest IP Law, LLP

(57) ABSTRACT

Disclosed are a composition for an Fe-based alloy and an Fe-based amorphous alloy powder, whereby a high-purity amorphous structure is maintained even after coating by thermal spraying or the like, but also various physical properties are improved. The composition for the Fe-based alloy includes iron, chromium, and molybdenum, wherein per 100 parts by weight of the iron, the chromium is contained in an amount of 25.4 to 55.3 parts by weight, the molybdenum is contained in an amount of 35.6 to 84.2 parts by weight, and at least one of carbon and boron is further contained.

15 Claims, 17 Drawing Sheets

(51) Int. Cl.
 *B05D 7/14*      (2006.01)
 *C22C 45/10*     (2006.01)
 *B33Y 70/00*     (2020.01)
 *C23C 4/067*     (2016.01)
 *C23C 4/129*     (2016.01)
 *C23C 4/134*     (2016.01)
 *B22F 3/10*      (2006.01)
 *B22F 9/08*      (2006.01)
 *C22C 1/04*      (2023.01)
 *C22C 38/22*     (2006.01)
 *C22C 38/32*     (2006.01)
 *B33Y 10/00*     (2015.01)

(52) U.S. Cl.
 CPC ............... *B22F 3/10* (2013.01); *B22F 9/082* (2013.01); *B33Y 70/00* (2014.12); *C22C 1/04* (2013.01); *C22C 33/0292* (2013.01); *C22C 38/22* (2013.01); *C22C 38/32* (2013.01); *C22C 45/10* (2013.01); *C23C 4/067* (2016.01); *C23C 4/129* (2016.01); *C23C 4/134* (2016.01); *B05D 2202/15* (2013.01); *B05D 2202/25* (2013.01); *B05D 2202/35* (2013.01); *B05D 2202/40* (2013.01); *B22F 2998/10* (2013.01); *B22F 2999/00* (2013.01); *B33Y 10/00* (2014.12); *C22C 2200/02* (2013.01)

(56) References Cited

U.S. PATENT DOCUMENTS

| | | | | |
|---|---|---|---|---|
| 11,427,902 | B2* | 8/2022 | Kang | C22C 45/001 |
| 2007/0295429 | A1 | 12/2007 | Yi | |
| 2013/0052361 | A1 | 2/2013 | Croopnick | |
| 2016/0047028 | A1 | 2/2016 | Kim | |
| 2016/0263653 | A1 | 9/2016 | Kim | |
| 2017/0159156 | A1* | 6/2017 | Chou | C22C 33/003 |

FOREIGN PATENT DOCUMENTS

| | | |
|---|---|---|
| CN | 102041467 A | 5/2011 |
| CN | 103898434 A | 7/2014 |
| CN | 105063546 A | 11/2015 |
| CN | 105256259 A | 1/2016 |
| CN | 106062234 A | 10/2016 |
| CN | 106995906 A | 8/2017 |
| CN | 107365951 A | 11/2017 |
| CN | 107442778 A | 12/2017 |
| CN | 109759590 A | 5/2019 |
| JP | 54103730 A | 8/1979 |
| JP | 58126962 A | 7/1983 |
| JP | 58126964 A | 7/1983 |
| JP | 61235537 A | 10/1986 |
| JP | 61235538 A | 10/1986 |
| JP | 2001254159 A | 9/2001 |
| JP | 2001303218 A | 10/2001 |
| JP | 2004140322 A | 5/2004 |
| JP | 2006097132 A | 4/2006 |
| JP | 2006214000 A | 8/2006 |
| JP | 2007083692 A | 4/2007 |
| JP | 2007084901 A | 4/2007 |
| JP | 2007084902 A | 4/2007 |
| JP | 2008045203 A | 2/2008 |
| JP | 2009155729 A | 7/2009 |
| JP | 2012214826 A | 11/2012 |
| KR | 100313348 A | 12/2001 |
| KR | 1020120139821 A | 10/2014 |
| KR | 20180050951 A | 5/2018 |

OTHER PUBLICATIONS

1st SG Written Opinion dated May 8, 2020.
2nd SG Written Opinion dated May 17, 2021.
CN Office Action dated Jun. 16, 2022.
EP search Report dated Feb. 7, 2022.
JP OA dated Feb. 22, 2022.
Austin T. Sutton, et al., "Powders for Additive Manufacturing Processes: Characterization Techniques and Effects on Part Properties", 'Solid Freeform Fabrication 2016: Proceedings of the 27th Annual International Solid Freeform Fabrication Symposium—An Additive Manufacturing Conference', Dec. 31, 2016, pp. 1004-1030.
The Examination Report issued by the Intellectual Property Office of Singapore(IPOS) dated Aug. 22, 2022.

* cited by examiner (a)

(b)

(c)

(a)

(b)

(c)

(d)

(a)      (b)      (c)

(d)      (e)

(f)      (g)

(a)

(b)

(c)

(d)

(a)

(b)

(c)

(a)

(b)

(c)

(a)

(b)

(c)

(a)            (b)            (c)

IRON-BASED ALLOY POWDER AND MOLDED ARTICLE USING SAME

CROSS REFERENCE TO RELATED APPLICATIONS

This application is a National Stage of International Application No. PCT/KR2018/006843 filed Jul. 11, 2019, claiming priority based on Singapore Patent Application No. 10-2018-05971S filed Jul. 11, 2018.

BACKGROUND OF THE INVENTION

Field of the Invention

The present invention relates generally to an Fe-based alloy powder and, more particularly, to an Fe-based alloy powder having a high amorphous forming ability and a shaped body using the same.

Description of the Related Art

Amorphous alloys, which are alloys with a disordered, chaotic atomic structure rather than a crystalline structure, exhibit excellent chemical, electrical, and mechanical properties. The amorphous alloys are made in the form of powders, ribbons, wires, powders, foils, or fibers by melt-spinning, atomizing, or the like.

Production of an amorphous alloy material is required to fulfill the following two conditions: 1) an alloy composition having a high amorphous forming ability; and 2) a rapid cooling rate of a molten alloy. That is, rapid cooling of the molten alloy is required. However, in many cases, when the composition itself is low in the amorphous forming ability even though the cooling is performed rapidly, the molten alloy does not have an amorphous phase.

Furthermore, even when an amorphous alloy material is obtained, a molten product thereof is difficult to form an amorphous phase, and thus there are many limitations in application thereof. That is, when the obtained amorphous alloy material is melted again at a high temperature to manufacture an application product, there is a problem in that a thermal sprayed coating may crystallize again.

For example, an alloy powder may be obtained by atomizing, and herein, there is difficulty in fulfilling a condition of a cooling rate that is more rapid than that of typical atomizing in order to obtain an amorphous alloy powder. Furthermore, in the case of manufacturing an application product using an amorphous alloy powder, for example, a coating by thermal spraying using an amorphous alloy powder, when the alloy powder is melted and cooled down, the condition of the more rapid cooling rate than that of atomizing as described above is not fulfilled, and thus the alloy powder is likely to be crystalline rather than amorphous. As a result, it is difficult to manufacture an application product that utilizes the properties of amorphous material. In this case, the manufactured application product may be poor in coating density, and when used for corrosion resistant applications, foreign substances may penetrate thereinto.

DOCUMENTS OF RELATED ART (Patent document 1) U.S. Pat. No. 5,288,344
(Patent document 2) U.S. Pat. No. 5,368,659

SUMMARY OF THE INVENTION

An objective of the present invention is to provide an Fe-based alloy composition having a high amorphous forming ability.

Another objective of the present invention is to provide an Fe-based alloy powder having a high amorphous phase proportion.

Still another objective of the present invention is to provide an Fe-based amorphous alloy powder that maintains a high proportion of amorphous phase in a manufactured shaped body upon manufacturing thereof.

Yet another objective of the present invention is to provide an Fe-based amorphous alloy powder that maintains a high proportion of amorphous phase in a manufactured shaped body even at a low cooling rate upon manufacturing of the shaped body.

In order to achieve the above objective, according to one aspect of the present invention, there is provided a composition for an Fe-based alloy, the composition including: iron; chromium; and molybdenum, wherein per 100 parts by weight of the iron, the chromium is contained in an amount of 25.4 to 55.3 parts by weight, the molybdenum is contained in an amount of 35.6 to 84.2 parts by weight, and at least one of carbon and boron is further contained.

According to another aspect of the present invention, there is provided an Fe-based amorphous alloy powder, including: iron; chromium; and molybdenum, wherein per 100 parts by weight of the iron, the chromium is contained in an amount of 25.4 to 55.3 parts by weight, the molybdenum is contained in an amount of 35.6 to 84.2 parts by weight, and at least one of carbon and boron is further contained.

According to still another aspect of the present invention, there is provided an Fe-based amorphous alloy powder, wherein proportion a of an amorphous phase in an alloy powder and proportion b of the amorphous phase in an alloy fulfill an equation of $0.9 \leq b/a \leq 1$, the alloy powder being prepared by melting a composition for an alloy containing iron, chromium, and molybdenum and further containing at least one of carbon and boron and then cooling the melted composition from a melting point to a glass transition temperature at a cooling rate of $10^1$ to $10^4$ degree/sec, and the alloy being prepared by re-melting the alloy powder and cooling the re-melted alloy powder from a melting point to a glass transition temperature at the cooling rate of $10^1$ to $10^4$ degree/sec.

According to still another aspect of the present invention, there is provided an Fe-based alloy shaped body that is manufactured by 3D printing using the above-described alloy powder, wherein a portion of an amorphous phase of an alloy in the shaped body is 90 to 100%.

According to still another aspect of the present invention, there is provided a shaped body that is manufactured by sintering using the above-described alloy powder, wherein the shaped body contains boride or carbide, or both the boride and carbide, and the boride and carbide are contained in a total amount of 3 to 8 parts by weight per 100 parts by weight of the iron.

The composition of the Fe-based alloy according to the embodiments of the present invention has a high amorphous forming ability. Therefore, it is possible that an Fe-based amorphous alloy powder having a high proportion of amorphous phase is obtained.

Furthermore, in the case of manufacturing a shaped body using the Fe-based amorphous alloy according to the embodiments of the present invention, even when the Fe-based amorphous alloy is melted or partially melted due to exposure to high temperature, crystallization does not proceed even at low cooling rate conditions during re-cooling, but a high proportion of amorphous phase is maintained. Therefore, it is possible that a high proportion of amorphous phase in a shaped body is maintained.

As a result, it is possible that even when a shaped body is manufactured by various processes such as thermal spraying, 3D printing, metallurgy, and the like, a high proportion of amorphous phase is maintained. Therefore, there is an advantage in that physical properties such as density, strength, wear resistance, friction resistance, and corrosion resistance of the shaped body are excellent.

BRIEF DESCRIPTION OF THE DRAWINGS

FIG. 1 shows XRD graphs of Fe-based amorphous alloy powders according to the present invention, in which FIGS. 1a to 1e are XRD graphs of Fe-based amorphous alloy powders of Examples 1, 3, 6, 7, and 8, respectively.

FIG. 2 shows XRD graphs of Fe-based alloy powders according to Comparative Examples, in which FIGS. 2a to 2c are XRD graphs of Fe-based alloy powders of Comparative Examples 1, 5, and 7, respectively.

FIG. 3 shows SEM images, in which FIGS. 3a and 3b are SEM images of an Fe-based amorphous alloy powder of Example 7 and a cross-section thereof, respectively, and FIGS. 3c and 3d are SEM images of an Fe-based alloy powder of Comparative Example 7 and a cross-section thereof, respectively.

FIG. 4 shows XRD graphs of coating samples according to the present invention, in which FIGS. 4a to 4e are XRD graphs of coating samples of Examples 9, 11, 14, 15, and 16 to which Fe-based amorphous alloy powders of Examples 1, 3, 6, 7, and 8 are applied, respectively.

FIG. 5 shows XRD graphs of coating samples of Comparative Examples, in which FIGS. 5a to 5c are XRD graphs of coating samples of Comparative Examples 8, 12, and 14 to which Fe-based alloy powders of Comparative Examples 1, 5, and 7 are applied, respectively.

FIG. 6 shows surface images of thermal sprayed coatings using Fe-based amorphous alloy powders according to the present invention and thermal sprayed coatings using alloy powders of Comparative Examples, in which FIGS. 6a to 6c are surface images of thermal sprayed coatings using Fe-based amorphous alloy powders of Examples 1, 7, and 8, respectively, and FIGS. 6d to 6g are surface images of thermal sprayed coatings using alloy powders of Comparative Examples 1, 3, 5, and 7, respectively.

FIG. 7 shows images (200× magnification) of cross-sections of thermal sprayed coating samples using Fe-based amorphous alloy powders of Examples 1, 3, 6, and 8 according to the present invention, which are observed with an optical microscope, in which FIGS. 7a to 7d are images of cross-sections of samples of Examples 9, 11, 14, and 16, respectively.

FIG. 8 shows images (200× magnification) of cross-sections of thermal sprayed coating samples using alloy powders of Comparative Examples 1, 4, and 7, which are observed with the optical microscope, in which FIGS. 8a to 8c are images of cross-sections of samples of Comparative Examples 8, 11, and 14, respectively.

FIG. 9 shows images (200× magnification) of uncorroded/corroded cross-sections of thermal sprayed coating samples using Fe-based amorphous alloy powders of Examples 2, 4, and 7 according to the present invention, which are observed with the optical microscope, in which FIGS. 9a to 9c are images of samples of Examples 10, 12, and 15, respectively.

FIG. 10 shows images (200× magnification) of uncorroded/corroded cross-sections of thermal sprayed coating samples using alloy powders of Comparative Examples 2, 4, and 6, which are observed with the optical microscope, in which FIGS. 10a to 10c are images of samples of Comparative Examples 8, 11, and 13, respectively.

FIG. 16 shows photographs of an MIM product and a 3D printed product using the Fe-based amorphous alloy powder of Example 7 according to the present invention, in which FIG. 16a is a photograph of a product manufactured in a complicated shape by MIM, and FIG. 16b is a photograph of a product manufactured by 3D printing, and FIG. 16c is a photograph of a three-dimensional statue manufactured by 3D printing.

DETAILED DESCRIPTION OF THE INVENTION

Figure 1:
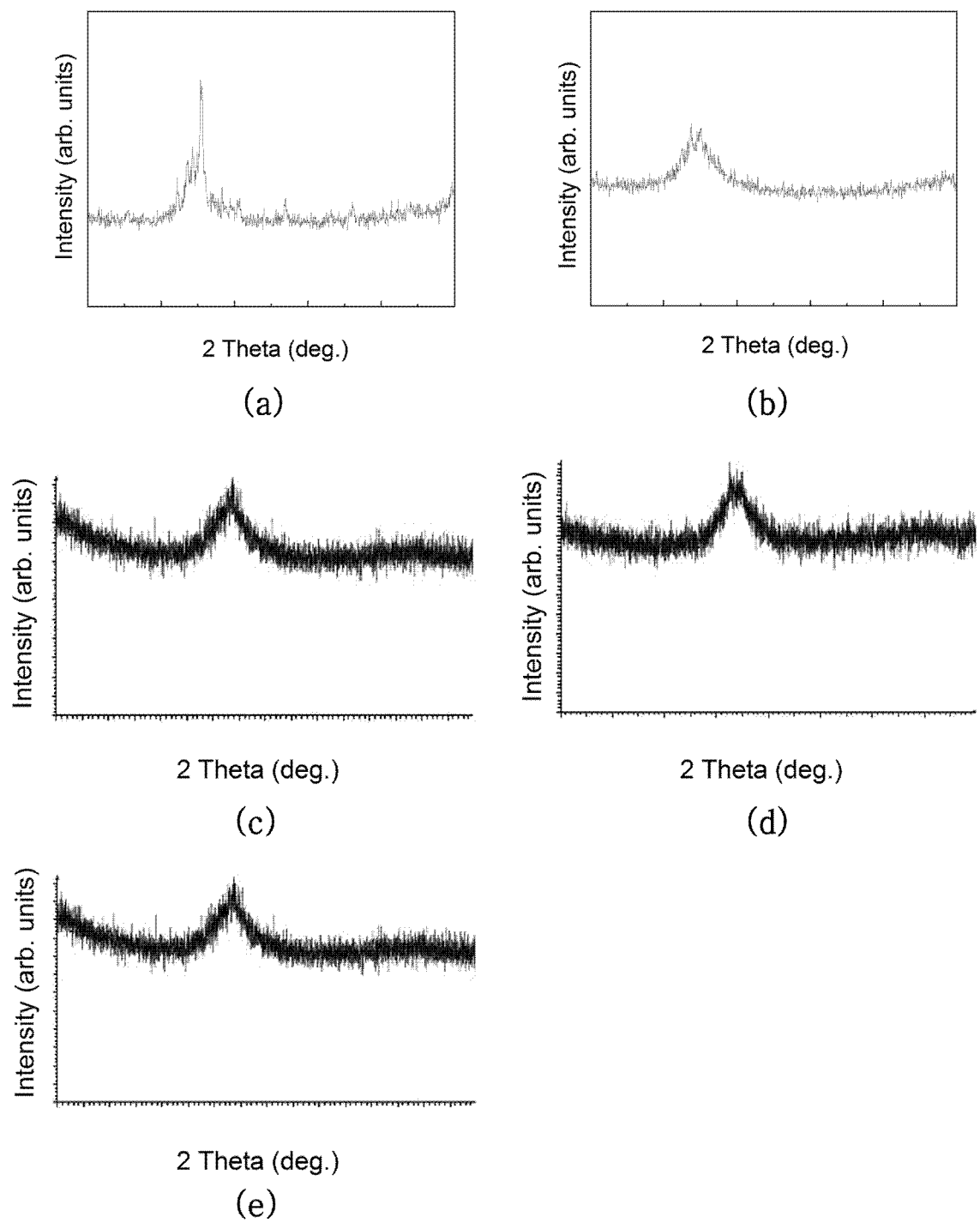

Hereinbelow, exemplary embodiments of the present invention will be described in detail.

In the present specification, "amorphous" refers to a phase (also used as a non-crystalline or amorphous phase) which lacks the long range order of a crystal, e.g., which does not have a crystalline structure.

Furthermore, in the present specification, "shaped body" refers collectively to an application product made using an Fe-based amorphous alloy powder, and examples thereof include a coating film, a coating layer, a molded body, and a molded product, which are mainly made by thermal spraying, metal powder injection molding (MIM), three-dimensional (3D) printing, metallurgy, or the like.

Furthermore, in the present specification, "Fe-based amorphous alloy powder" refers an alloy powder in which iron is contained at the highest weight ratio, and an amorphous phase is not simply contained in the powder, but substantially occupies most of the powder, for example, the amorphous phase is contained in a proportion of equal to or greater than 90%.

<Alloy Composition for Preparing Fe-Based Amorphous Alloy Powder>

An alloy composition according to an embodiment of the present invention for preparing an Fe-based amorphous alloy powder includes a first component, a second component, a third component, and a fourth component.

The first component is iron (Fe). Iron (Fe) is a component used to improve the rigidity of an alloy powder coating and may be appropriately varied to fulfill the strength of a desired alloy coating.

The second component is chromium (Cr). The second component is used to improve the physical properties of the alloy powder coating, such as wear resistance, corrosion resistance, and the like.

The second component may be contained in an amount of equal to or less than 55.3 parts by weight per 100 parts by weight of the first component, preferably 25.4 to 55.3 parts by weight. This is because when the amount of the second component is outside such a range, the amorphous forming ability is reduced, and the shaped body is reduced in wear resistance and corrosion resistance.

The third component is molybdenum (Mo) used to impart the physicochemical properties of the alloy powder coating, such as wear resistance, corrosion resistance, and friction resistance.

The third component may be contained in an amount of equal to or less than 84.2 parts by weight per 100 parts by weight of the first component, preferably 35.6 to 84.2 parts by weight.

This is because when the amount of the third component is outside such a range, the amorphous forming ability is reduced, the shaped body is reduced in friction resistance, wear resistance, and corrosion resistance and is increased in manufacturing cost, while being environmentally unfriendly.

Herein, it is preferable that when the first component is 100 parts by weight, the combined amount of the second component and the third component is not greater than 100 parts by weight.

The fourth component uses at least one or two of carbon (C) and boron (B). The fourth component is used to improve the amorphous forming ability by atomic size mismatch with the other components, packing ratio efficiency, or the like.

It is preferable that the fourth component is contained in an amount of equal to or less than 23.7 parts by weight, 1.7 to 23.7 parts by weight, 3.4 to 23.7 parts by weight, or 3.4 to 15 parts by weight, per 100 parts by weight of the first component. This is because when the amount of the fourth component is outside such a range, the hardness or amorphous forming ability of the alloy powder coating is reduced or the brittleness is reduced.

In the fourth component, even when at least one of carbon and boron is used, an excellent amorphous forming ability is exhibited. However, it is more preferable that both carbon and boron are more used. Herein, the amount of boron is equal to or greater than 3.4 parts by weight, preferably 3.4 to 10.5 parts by weight.

The amorphous forming ability as described above is considered to be given due to the difference in atomic size of each element, packing ratio, deep eutectic, and the difference in reaction entropy.

In addition to the above-described components, the alloy composition may intentionally or unintentionally include additional components selected from the group consisting of tungsten, cobalt, yttrium, manganese, silicon, aluminum, niobium, zirconium, phosphorus, nickel, scandium, and a mixture thereof. In terms of amount of the additional components, the additional components are contained in a total amount of less than 1.125 parts by weight, equal to or less than 1.000 parts by weight, or equal to or less than 0.083 parts by weight, per 100 parts by weight of iron. That is, when the amounts of the first component, the second component, the third component, the fourth component, and the additional components fulfill the above-described weight proportions, this case is regarded as an Fe-based alloy composition according to the embodiment of the present invention.

Furthermore, each of the additional components is contained in an amount of equal to or less than 0.9 parts by weight, preferably equal to or less than 0.05 parts by weight. This is because when the amount of the additional component is outside such a range, the amorphous forming ability is significantly reduced.

<Preparation of Fe-Based Amorphous Alloy Powder>

An Fe-based amorphous alloy powder according to the present invention is prepared by a known method, for example, atomizing.

Atomizing is a method whereby a stream of molten alloy is atomized into droplets while gas or water is sprayed thereagainst, and then the atomized droplets of the molten alloy are rapidly cooled down during free fall, thus preparing an alloy powder. Atomizing is a well-known technique for preparing a metal powder, and thus a detailed description thereof will be omitted.

In order to prepare an amorphous powder by atomizing, it is required to rapidly cool down the atomized droplets. This is because the molten alloy solidifies without being given time to crystallize, thus being advantageous in being able to be amorphous.

Therefore, in order to prepare an alloy powder having a higher proportion of amorphous phase by atomizing, provision of special cooling equipment to increase the cooling rate is required.

The alloy composition according to an aspect of the present invention is excellent in the amorphous forming ability to form a high proportion of amorphous phase in the alloy composition itself, even using conventional atomizing, thus ensuring that an amorphous powder having a high amorphous phase proportion is prepared.

That is, in the case of conventional atomizing not having special cooling equipment, an amorphous powder can be prepared by the alloy composition according to the present embodiment even at a cooling rate of $10^2$ to $10^3$ or $10^1$ to $10^4$ (degree/sec). Herein, $10^{1-2}$ (degree/sec) is a cooling rate substantially close to the cooling rate of air cooling, which is a cooling rate when a molten alloy is jetted into the air.

<Fe-Based Amorphous Alloy Powder>

The Fe-based amorphous alloy powder according to the present invention is, for example, a powder having a high amorphous phase proportion, such as when an amorphous phase is contained in a proportion of equal to or greater than 90%, equal to or greater than 95%, equal to or greater than 99%, equal to or greater than 99.9%, or substantially 100% when prepared by the above-described atomizing. That is, an Fe-based amorphous alloy powder having a high amorphous phase proportion as described above is prepared in accordance with the cooling rate.

The Fe-based amorphous alloy powder according to an embodiment of the present invention may be prepared in a variety of shapes and diameters without being limited thereto. The Fe-based amorphous alloy powder includes the first component, the second component, the third component, and the fourth component that are used for making the Fe-based amorphous alloy described above.

The first component is iron (Fe). Iron (Fe) is a component used to improve the rigidity of an alloy powder coating. The second component is chromium (Cr) used to improve the physical properties of the alloy powder coating, such as wear resistance, corrosion resistance, and the like. The second component may be contained in an amount of equal to or less than 55.3 parts by weight per 100 parts by weight of the first component, preferably 25.4 to 55.3 parts by weight.

The third component is molybdenum (Mo) used to impart the wear resistance, corrosion resistance, and friction resistance. The third component may be contained in an amount of equal to or less than 84.2 parts by weight per 100 parts by weight of the first component, preferably 35.6 to 84.2 parts by weight.

The fourth component uses at least one or two of carbon (C) and boron (B). The fourth component is used to improve the amorphous forming ability by atomic size mismatch with the other components, packing ratio efficiency, or the like. It is preferable that the fourth component is contained in an amount of equal to or less than 23.7 parts by weight, 1.7 to 23.7 parts by weight, 3.4 to 23.7 parts by weight, or 3.4 to 15 parts by weight, per 100 parts by weight of the first component.

In addition to the above-described components, the Fe-based amorphous alloy powder may intentionally or unintentionally include additional components selected from the group consisting of tungsten, cobalt, yttrium, manganese, silicon, aluminum, niobium, zirconium, phosphorus, nickel, scandium, and a mixture thereof. In terms of amount of the additional components, the additional components are contained in a total amount of less than 1.125 parts by weight, equal to or less than 1.000 parts by weight, or equal to or less than 0.083 parts by weight, per 100 parts by weight of iron. That is, when the amounts of the first component, the second component, the third component, the fourth component, and the additional components fulfill the above-described weight proportions, this case is regarded as an Fe-based alloy powder according to the embodiment of the present invention.

Furthermore, each of the additional components is contained in an amount of equal to or less than 0.9 parts by weight, preferably equal to or less than 0.05 parts by weight. This is because when the amount of the additional component is outside such a range, the amorphous forming ability is significantly reduced. The Fe-based amorphous alloy powder according to the embodiment of the present invention has excellent properties such as density, strength, wear resistance, friction resistance, and corrosion resistance due to the high amorphous phase proportion.

The Fe-based amorphous alloy powder prepared according to embodiments of the present invention may have an average particle size in a range of 1 to 150 μm, but is not limited thereto. The powder size thereof may be controlled by sieving depending on uses.

For example, when thermal spraying is to be performed, a target Fe-based amorphous alloy powder may be used after controlling the powder size in a range of 16 to 54 μm by sieving. When metal powder injection molding (MIM) is to be performed, the target Fe-based amorphous alloy powder may be used after controlling the powder size to be equal to or less than 20 μm by sieving.

Furthermore, when three-dimensional (3D) printing is to be performed, the powder size of the target Fe-based amorphous alloy powder may be controlled depending on 3D printing methods. For example, when 3D printing is to be performed by a powder bed fusion method, the powder size may be controlled to be equal to or less than 20 μm, and when 3D printing is to be performed by a direct energy deposit method, the powder size may be controlled to be in a range of 54 to 150 μm.

The Fe-based amorphous alloy powder according to an embodiment of the present invention may have a density, for example, in a range of about 7±0.5 g/cc, but is not limited thereto.

The Fe-based amorphous alloy powder according to an embodiment of the present invention may have a hardness in a range of about 800 to 1500 Hv, but is not limited thereto.

The Fe-based amorphous alloy powder according to embodiments of the present invention is characterized by maintaining the above-described proportion of the amorphous phase even when re-melted or when exposed to high temperature and re-cooled for solidification. Herein, proportion a of the amorphous phase in the Fe-based amorphous alloy powder prepared by atomizing and proportion b of an alloy made by melting the Fe-based amorphous alloy powder above the melting point of the alloy and then re-cooling the same fulfill the following equation.

$$0.9 \leq b/a \leq 1 \quad \text{[Equation 1]}$$

Here, examples of a method of making an alloy by melting the Fe-based amorphous alloy powder above the melting point of the alloy and then re-cooling the same in order to derive the b may include thermal spraying, 3D printing, and a known casting method such as metallurgy.

In addition, the ratio of b/a of the Equation 1 may be preferably 0.95 to 1, more preferably 0.98 to 1, and more preferably 0.99 to 1.

Furthermore, the Fe-based amorphous alloy powder according to the present invention may be made as soft magnetic powder due to excellent electrical properties thereof.

<Formation of Coating Using Fe-Based Amorphous Alloy Powder>

The Fe-based amorphous alloy powder according to embodiments of the present invention may be applied to a general coating or casting method such as thermal spraying, 3D printing, or metallurgy as described above to form a shaped body (a coating).

For example, the Fe-based amorphous alloy powder is applied to a thermal spraying process to form a coating on an object.

Thermal spraying is a technique whereby a metal or metal compound is melted into fine droplets and sprayed onto a surface of an object to come into close contact with the surface. Examples of thermal spraying include high velocity oxygen fuel (HVOF) spraying, plasma spraying, laser cladding, general flame spraying, diffusion, cold spraying, vacuum plasma spraying (VPS), low-pressure plasma spraying (LPPS), and the like.

Thermal spraying involves a process of melting an Fe-based amorphous alloy powder into droplets to form a shaped body. In thermal spraying, it is problematic in that the molten amorphous alloy powder melted when exposed to high temperature is not cooled rapidly and thus is crystallized entirely or partially, resulting in the proportion of the amorphous phase being significantly lowered.

Therefore, while an amorphous metal powder in the related art has a high amorphous phase proportion, it is impossible that a molded product has excellent properties of amorphous metals.

However, the Fe-based amorphous alloy powder according to the present invention has excellent amorphous forming ability to form an amorphous phase even without securing a rapid cooling rate. This fact has an advantage in that the proportion of the amorphous phase is not lowered in the shaped body even after the process of making the shaped body described above.

That is, when the Fe-based amorphous alloy powder, which has a high amorphous phase proportion, such as when an amorphous phase is contained in a proportion of equal to or greater than 90%, equal to or greater than 95%, equal to or greater than 99%, equal to or greater than 99.9%, or substantially 100%, is used as a thermal spraying material, a coating contains an amorphous phase in a proportion of equal to or greater than 90%, equal to or greater than 95%, equal to or greater than 99%, equal to or greater than 99.9%, or substantially 100% by volume of the total structure, thus having very excellent physical properties. Particularly, when HVOF spraying is performed using the alloy powder according to the present invention, the degree of improvement of physical properties is maximized because the proportion of the amorphous phase is substantially maintained.

Furthermore, the Fe-based amorphous alloy powder according to an embodiment of the present invention exhibits a very high coating density of 98 to 99.9% upon measurement, which has an advantage in suppressing penetration of corrosives through pores.

The Fe-based amorphous alloy powder used in thermal spraying has a particle size of 10 to 100 μm, preferably 15 to 55 μm. This is because when the alloy powder has a particle size of less than 10 μm, small particles may adhere to a spraying gun during a spray coating process, which may contribute to a reduction in operating efficiency. Further, this is also because when the alloy powder has a particle size of greater than 100 μm, the alloy powder may collide with a base metal without being completely dissolved (i.e., may fall to the bottom without forming a coating), resulting in a reduction in coating productivity and efficiency.

Meanwhile, the Vickers hardness of the shaped body including the Fe-based amorphous alloy powder according to an embodiment of the present invention is 700 to 1,200 Hv (0.2), preferably 800 to 1,000 Hv (0.2), and the friction coefficient (friction resistance) is 0.001 to 0.08 μm, preferably equal to or less than 0.05 μm at a load of 100 N, and is 0.06 to 0.12 μm, preferably equal to or less than 0.10 μm at a load of 1,000 N.

Particularly, in the case of a coating formed by HVOF spraying, unlike the related art, there are almost no pores present in the cross-section, and thus the coating exhibits a full density. On the contrary, even when the pores are present, a porosity of only about 0.1 to 1.0% is exhibited.

That is, when HVOF spraying is performed, a structure in which multiple paths are stacked is formed. In detail, oxides (black color) are accumulated on each layer, and multiple layers are stacked in a wave-like shape. While this usually causes the properties of a coating to be degraded and weakened, in the present invention, the coating has no pore/oxidation film, thus ensuring that the coating exhibits ultra-high density, and the performance thereof is improved. Moreover, in the present invention, it is possible that a coating or a shaped body containing the Fe-based amorphous alloy powder exhibits improved wear resistance, corrosion resistance, and elasticity, which are advantageous over a case using an alloy powder in the related art.

<Formation of Shaped Body by Powder Metallurgy or the Like Using Fe-Based Amorphous Alloy Powder>

The Fe-based amorphous alloy powder according to embodiments of the present invention may be applied to a process such as metal powder injection molding (MIM), powder metallurgy (P/M), or the like as described above to manufacture a shaped body.

In detail, the Fe-based amorphous alloy powder may be applied to a process selected from the group consisting of a metal powder injection molding and powder metallurgy to manufacture a shaped body.

Metal powder injection molding is a process whereby resin, wax, and the like are mixed to metal powder and injected into a mold by an injection molding machine at 370 to 520° C. for a molding process, then a binder is heated for removal, and finally a final precision part is obtained by sintering.

Powder metallurgy is a process whereby metal powder or alloy powder is prepared, then the metal or alloy powder is compacted, and a powder compact is sintered below the melting point of the powder to obtain a metal product or a metal ingot.

When performing metal powder injection molding or powder metallurgy using the alloy powder containing carbon and/or boron according to the present invention, the shaped body is partially crystallized during sintering and thus it is not easy to form a high-purity amorphous phase. However, the composition according to an embodiment of the present invention contains boron and carbon, which provides an advantage of preparing a composite that can form high-quality phases that cannot be realized only by metals themselves, and hard precipitates of boride and carbide.

Therefore, when performing metal powder injection molding or powder metallurgy using the alloy powder according to an embodiment of the present invention, it is possible that a unique composite in which hard ceramic precipitates (boride/carbide) are present in a base metal that utilizes the unique properties of metals is prepared.

Herein, it is preferable that boride and carbide which are ceramic precipitates contained in the shaped body are contained in an amount of 3 to 8 parts by weight per 100 parts by weight of iron. This is because when the amount is less than 3 parts by weight, sufficient hardness and wear improvement effect may not be exhibited, and when the amount is greater than 8 parts by weight, brittleness may be lowered.

<Formation of 3D-Printed Shaped Body Using Fe-Based Amorphous Alloy Powder>

The Fe-based amorphous alloy powder according to embodiments of the present invention may be applied to metal 3D printing as described above to manufacture a shaped body.

Unless otherwise noted herein, the metal 3D printing refers to a method whereby when a design is input into a computer, layers of metal powder used as raw materials are melted, and a 3D-solid material is created from the design. Herein, as the metal powder used as raw materials, the Fe-based amorphous alloy powder according to embodiments of the present invention may be used.

That is, the metal 3D printing is a method of manufacturing a shaped body by instantaneous melting of metal powder with a laser or the like. However, there is no method of cooling the molten metal. Due to this, other powders in the related art may be significantly lowered in the amorphous forming ability due to the cooling rate close to the cooling rate of air cooling, thus being difficult to maintain amorphous phases. However, when a 3D-printed shaped body is manufactured using the alloy powder according to the present invention, it is possible that a high proportion of amorphous phase is formed even at a low cooling rate (see FIG. 17).

Hereinbelow, to aid to understanding the invention, exemplary embodiments of the present invention will be described. It should be understood that the embodiments of the present invention are only examples of the invention and those skilled in the art will appreciate that various modifications, additions and substitutions are possible, without departing from the scope and spirit of the invention as disclosed in the accompanying claims.

EXAMPLES

Example 1 to Example 8: Preparation of Fe-Based Amorphous Alloy Powder

Powders containing compositions having the components and weight ratio as shown in Table 1 below were fed into an atomizer under a nitrogen gas atmosphere, and then atomized in a molten state and cooled at a cooling rate shown in Table 1 below, whereby Fe-based amorphous alloy powders of Examples 1 to 8 were prepared.

TABLE 1

| Classification | Example 1 | Example 2 | Example 3 | Example 4 | Example 5 | Example 6 | Example 7 | Example 8 |
|---|---|---|---|---|---|---|---|---|
| Fe | 1 | 1 | 1 | 1 | 1 | 1 | 1 | 1 |
| Cr | 0.55 | 0.26 | 0.355 | 0.292 | 0.374 | 0.355 | 0.292 | 0.374 |
| Mo | 0.84 | 0.36 | 0.645 | 0.502 | 0.411 | 0.645 | 0.502 | 0.411 |
| C | 0.06 | — | 0.092 | — | .056 | 0.092 | 0.080 | 0.056 |
| B | — | 0.04 | — | 0.04 | — | 0.1 | 0.092 | 0.04 |
| Cooing rate(degree/sec) | $10^4$ | $10^4$ | $10^4$ | $10^3$ | $10^3$ | $10^2$ | $10^2$ | $10^2$ |
| *Powder average diameter | 5 | 5 | 10 | 20 | 20 | 50 | 50 | 50 |

*D50 (unit: μm)

As can be seen from Table 1, the Examples according to the present invention contained the first to fourth components in a specific amount range and were cooled at a cooling rate of $10^1$ to $10^4$ (degree/sec) to prepare alloy powders having a powder average diameter of 5 to 50 μm.

Example 9 to Example 16: Formation of Coating Using Fe-Based Amorphous Alloy Powder Coatings having a thickness of 0.3 mm were formed by using the Fe-based amorphous alloy powders of Examples 1 to 8. Oerlikon Metco Diamond Jet series HVOF gas fuel spray system was used, fuel was oxygen and propane gas, and high velocity oxygen fuel (HVOF) was used, with a spray distance of 30 cm. The device and specific conditions used herein are as follows.

DJ Gun HVOF

[Condition] Gun type: Hybrid, Air cap: 2701, LPG flow: 160 SCFH, LPG pressure: 90 PSI, Oxygen flow: 550 SCFH, Oxygen pressure: 150 PSI, Air flow: 900 SCFH, Air pressure: 100 PSI, Nitrogen flow: 28 SCFH, Nitrogen pressure: 150 PSI, Gun speed: 100 m/min, Gun pitch: 3.0 mm, Feeder rate 45 g/min, Stand-off distance: 250 mm

Comparative Example 1 to Comparative Example 7: Preparation of Fe-Based Alloy Powder Powders containing compositions having the components and weight ratio as shown in Table 2 below were fed into an atomizer under a nitrogen gas atmosphere, and then atomized in a molten state and cooled at a cooling rate shown in Table 2 below, whereby Fe-based alloy powders of Comparative Examples 1 to 7 were prepared.

TABLE 2

| Classification | Comparative example 1 | Comparative example 2 | Comparative example 3 | Comparative example 4 | Comparative example 5 | Comparative example 6 | Comparative example 7 |
|---|---|---|---|---|---|---|---|
| Fe | 1 | 1 | 1 | 1 | 1 | 1 | 1 |
| Cr | 0.56 | 0.20 | 0.714 | 0.714 | 0.550 | 0.411 | 0.196 |
| Mo | 0.30 | 0.85 | 0.345 | 0.245 | 0.183 | 0.374 | 0.686 |
| C | — | — | 0.020 | 0.060 | 0.028 | 0.028 | 0.020 |
| B | — | 0.04 | — | — | 0.073 | 0.056 | 0.059 |
| Cooling rate(degree/sec) | $10^4$ | $10^4$ | $10^4$ | $10^3$ | $10^2$ | $10^2$ | $10^2$ |
| *Powder average diameter | 5 | 5 | 10 | 20 | 50 | 50 | 50 |

*D50 (unit: μm)

As can be seen from Table 2, the Comparative Examples according to the present invention contained the first to fourth components in a specific amount range and were cooled at a cooling rate of $10^1$ to $10^4$ (degree/sec) to prepare alloy powders having a powder average diameter of 5 to 50 µm.

Comparative Example 8 to Comparative Example 14: Formation of Coating Using Fe-Based Alloy Powder Coatings of Comparative Examples 8 to 14 were formed in the same manner as in Examples using the alloy powders of Comparative Examples 1 to 7.

Test Example 1: Evaluation of Amorphousness of Alloy Powder

XRD measurement results for Fe-based amorphous alloy powders of Examples were shown in FIG. 1. FIG. 1 shows XRD graphs of Fe-based amorphous alloy powders according to the present invention, in which FIGS. 1a to 1e are XRD graphs of Fe-based amorphous alloy powders of Examples 1, 3, 6, 7, and 8, respectively. As shown in FIG. 1, it was found that each of Examples 1, 3, 6, 7, and 8 had a broad peak at a 2-Theta (2θ) value of 40 to 50 degree angles, and each of which formed an amorphous phase.

Figure 2:
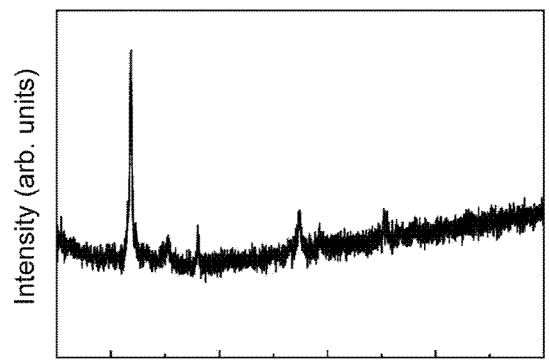
Figure 2:
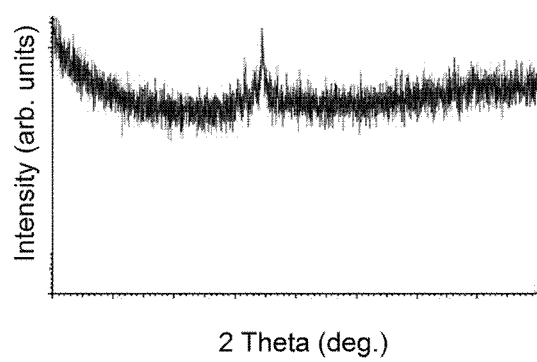
Figure 2:
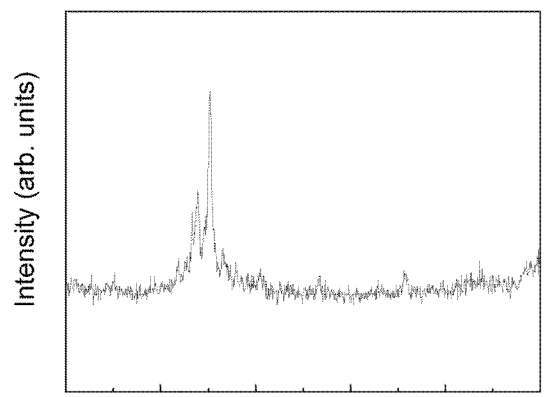

Furthermore, XRD measurement results for Fe-based amorphous alloy powders of Comparative Examples were shown in FIG. 2. FIG. 2 shows XRD graphs of Fe-based alloy powders according to Comparative Examples, in which FIGS. 2a to 2c are XRD graphs of Fe-based alloy powders of Comparative Examples 1, 5, and 7, respectively. As shown in FIG. 2, it was found that each of Comparative Examples 1, 5 and 7 had a first sharp peak at a 2-Theta (2θ) value of 40 to 50 degree angles and an additional second peak at 65 to 70 degree angles at a minimum, and each of which formed some crystalline phase together with an amorphous phase.

Particularly, considering the height of the second peak, it was found that the number of crystalline phases increased sequentially from Comparative Example 7, Comparative Example 5, to Comparative Example 1, i.e., from FIG. 2c to FIG. 2a.

Test Example 2: Evaluation of Amorphousness of Coating

Figure 3:
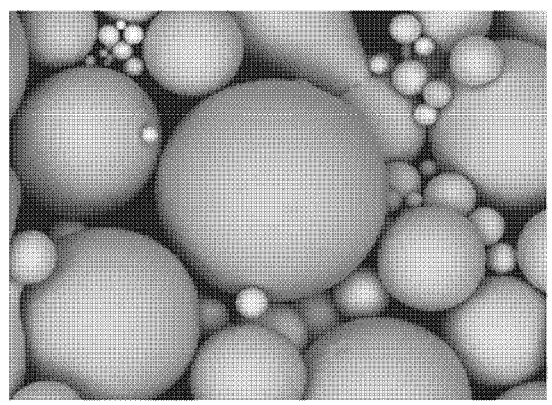
Figure 3:
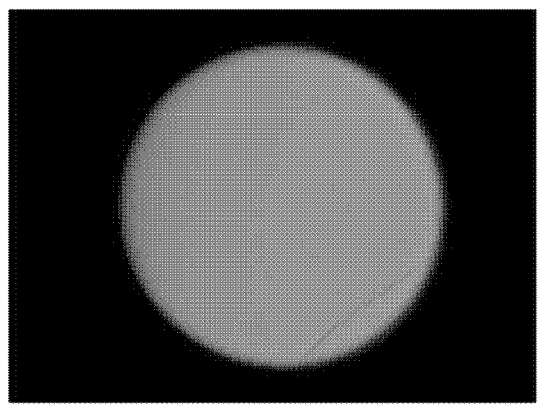
Figure 3:
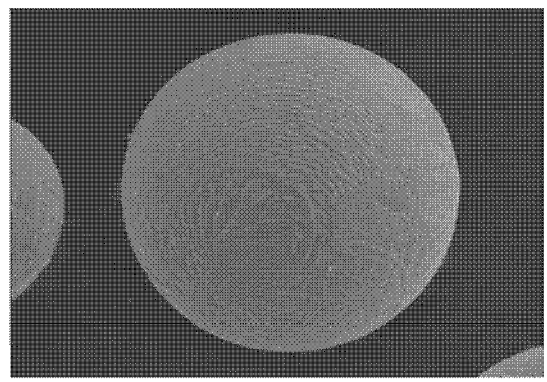
Figure 3:
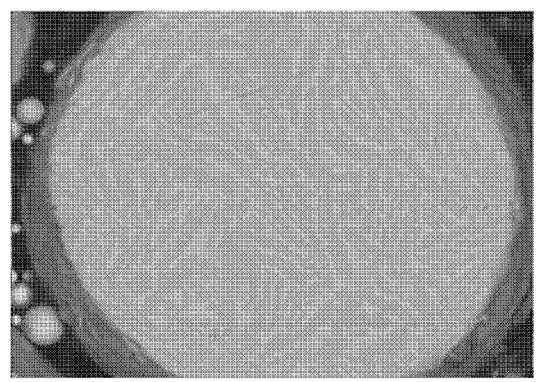

In FIG. 3, SEM images of an Fe-based amorphous alloy powder (as atomized) according to Example 7 and the cross-section thereof, and an Fe-based alloy powder (as atomized) according to Comparative Example 7 and the cross-section thereof are shown. FIGS. 3a and 3b respectively show the Fe-based amorphous alloy powder (as atomized) of Example 7 and the cross-section thereof, and FIGS. 3c and 3d respectively show the Fe-based alloy powder (as atomized) of Comparative Example 7 and the cross-section thereof.

As shown in FIG. 3c, it was found that no structure was observed, thus showing a porosity of substantially 0%.

On the other hand, as shown in FIG. 3d, it was found that a number of structures were observed.

Figure 4:
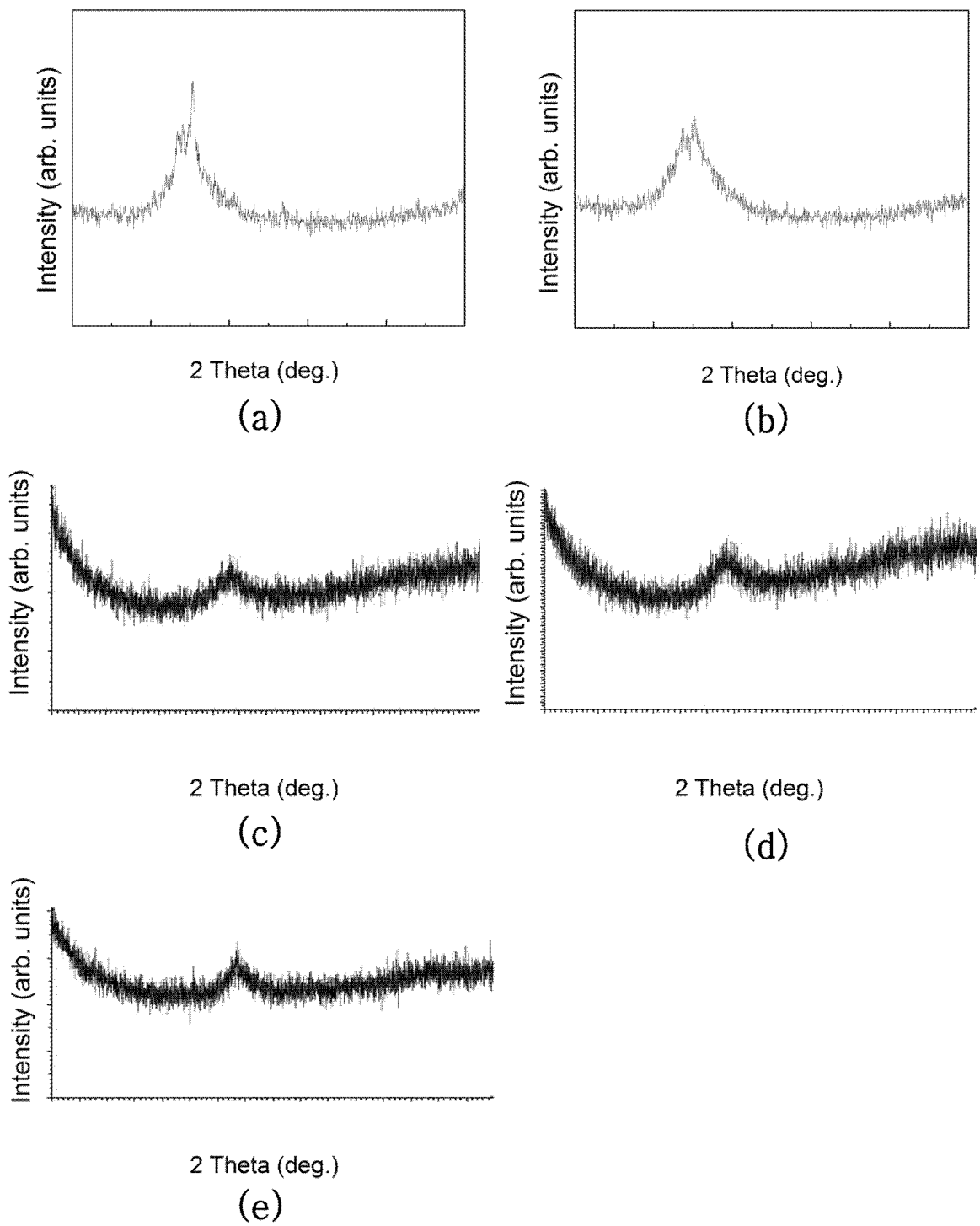

Furthermore, in FIG. 4, amorphous XRD graphs of Fe-based amorphous alloy powder coating samples prepared in Examples 9 to 16 are shown. FIG. 4 shows XRD graphs of coating samples according to the present invention, in which FIGS. 4a to 4e are XRD graphs of coating samples of Examples 9, 11, 14, 15, and 16 to which Fe-based amorphous alloy powders of Examples 1, 3, 6, 7, and 8 are applied, respectively. Referring to FIG. 4, in each of the Examples, an additional peak is not present while a wide XRD first peak is present. Therefore, it was found that powders according to the present invention had an amorphous structure.

Figure 5:
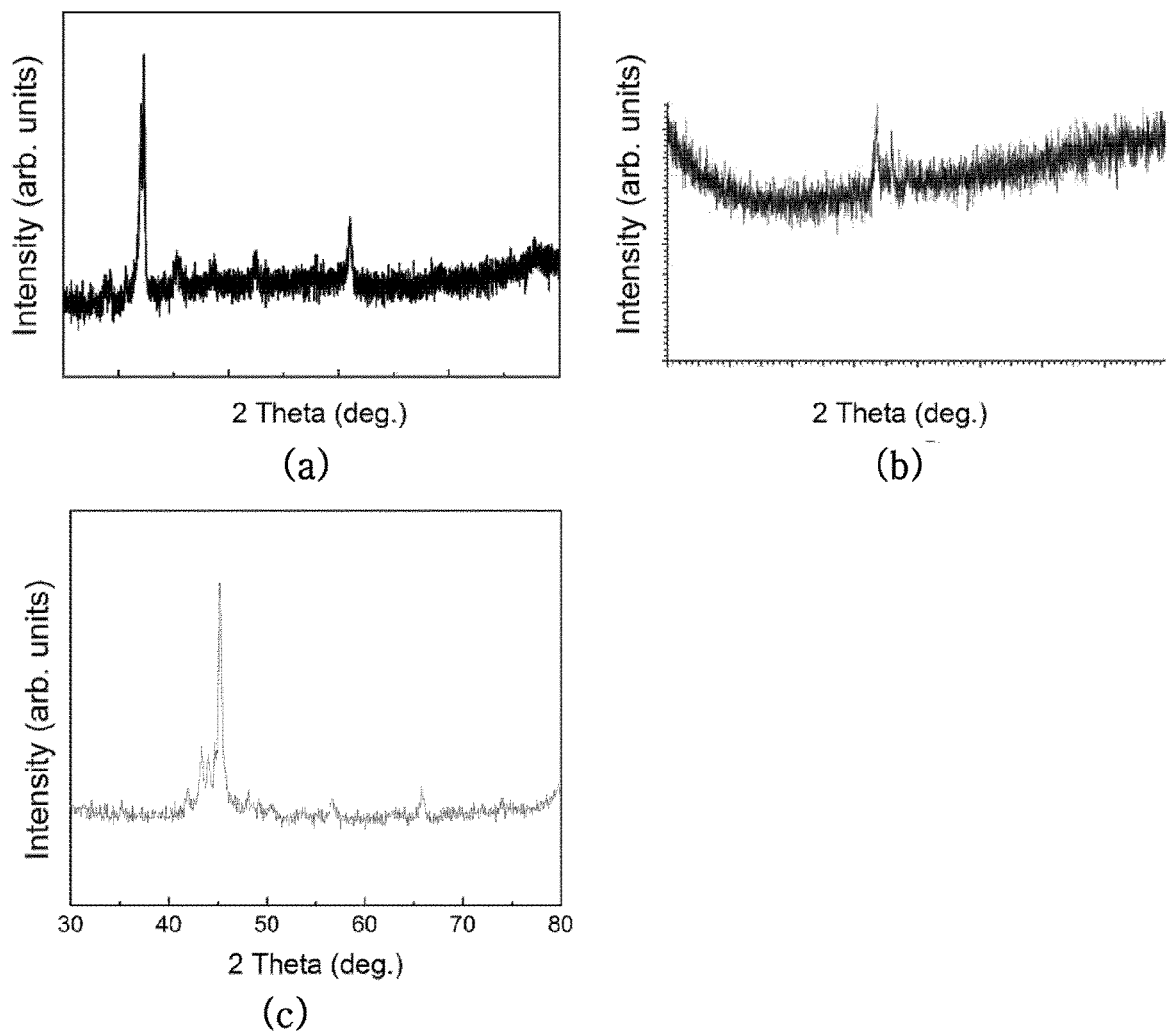

Furthermore, in FIG. 5, XRD graphs of Fe-based alloy powder coating samples prepared in Comparative Examples are shown. FIG. 5 shows XRD graphs of coating samples of Comparative Examples, in which FIGS. 5a to 5c are XRD graphs of coating samples of Comparative Examples 8, 12, and 14 to which Fe-based alloy powders of Comparative Examples 1, 5, and 7 are applied, respectively. Referring to FIG. 5, in each of the Comparative Examples, an additional peak is present together with a sharp first peak. Therefore, it was found that powders according to the Comparative Examples were crystalline powders having no amorphous phase.

That is, it was found from such results that the alloy powders according to the present invention had a much higher amorphous forming ability than the alloy powders according to the Comparative Examples.

As a result of comparison between the XRD graphs of FIG. 1 and the XRD graphs of FIG. 3, as shown in FIG. 3, it was found that in all of the Examples, the amorphous structure of the powder was maintained even in the coating.

Particularly, in the case of the present test example, it was found that that a coating is formed to entirely have a substantially amorphous phase (equal to or greater than 95% by volume) by HVOF spraying.

Figure 6:
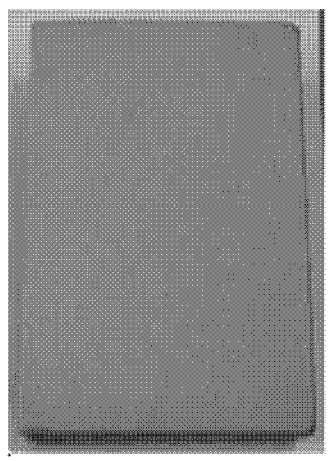
Figure 6:
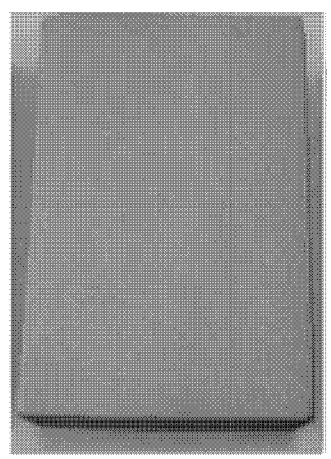
Figure 6:
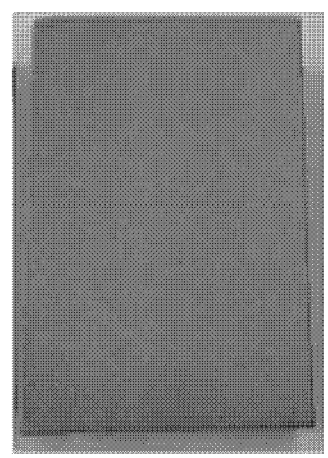
Figure 6:
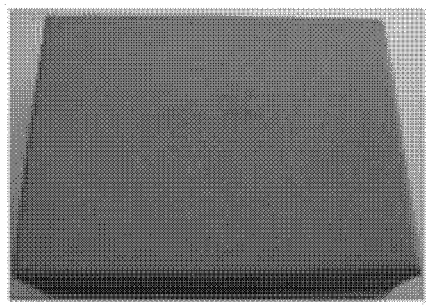
Figure 6:
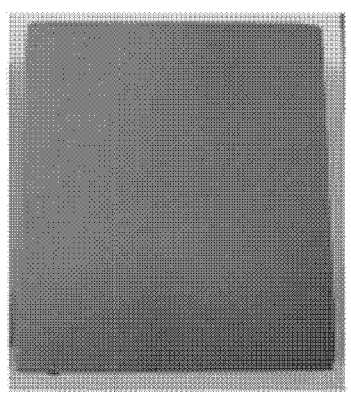
Figure 6:
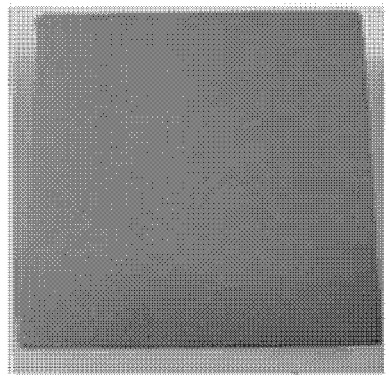
Figure 6:
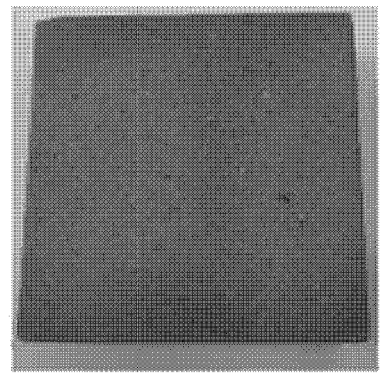

Test Example 3: Macroscopic Quality Evaluation of Thermal Sprayed Coating Using Alloy Powder FIG. 6 shows surface images of thermal sprayed coatings using Fe-based amorphous alloy powders according to the present invention and thermal sprayed coatings using alloy powders of Comparative Examples, in which FIGS. 6a to 6c are surface images of thermal sprayed coatings of Examples 9, 15, and 16 using Fe-based amorphous alloy powders of Examples 1, 7, and 8, respectively, and FIGS. 6d to 6g are surface images of thermal sprayed coatings of Comparative Examples 8, 10, 12, and 14 using alloy powders of Comparative Examples 1, 3, 5, and 7, respectively.

As a result of evaluation, it was found that the coating of Comparative Example 14 had poor coating surface quality (see FIG. 6g), and the coatings of the remaining Examples and Comparative Examples all had excellent or good coating surface quality.

Figure 7:
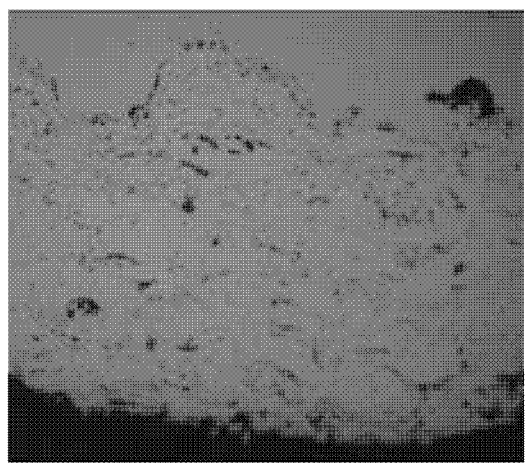
Figure 7:
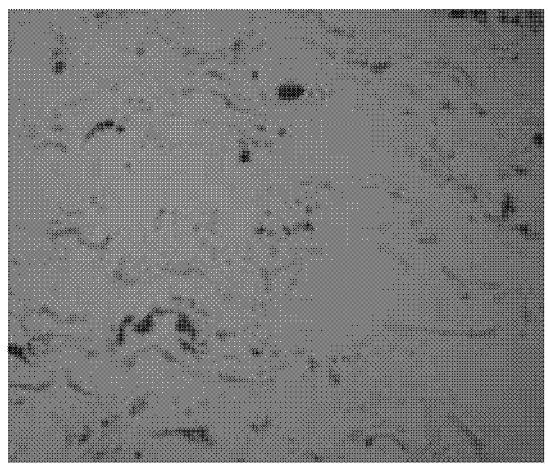
Figure 7:
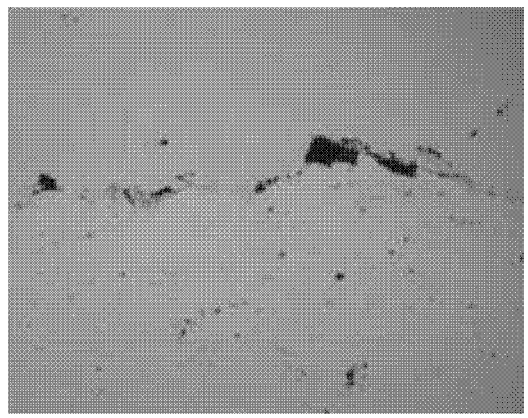
Figure 7:
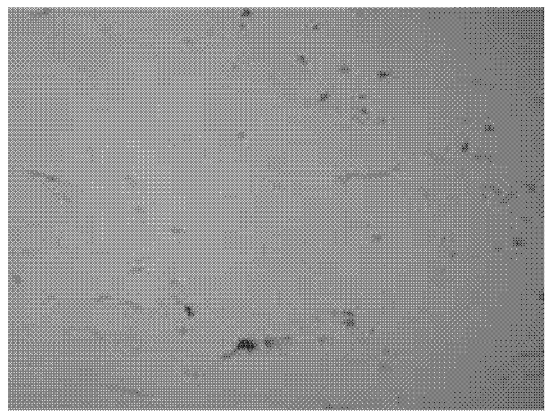
Figure 8:
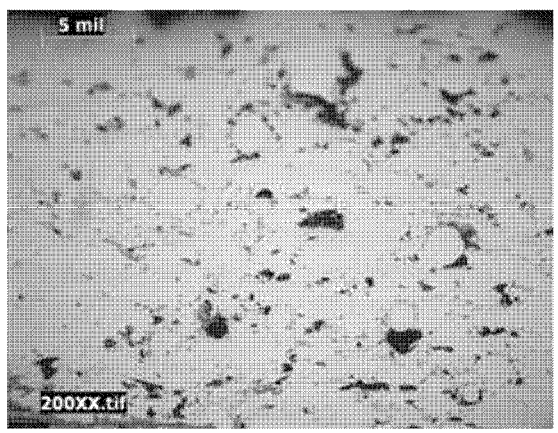
Figure 8:
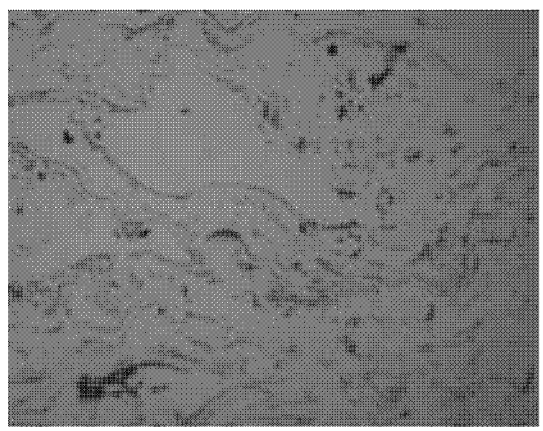
Figure 8:
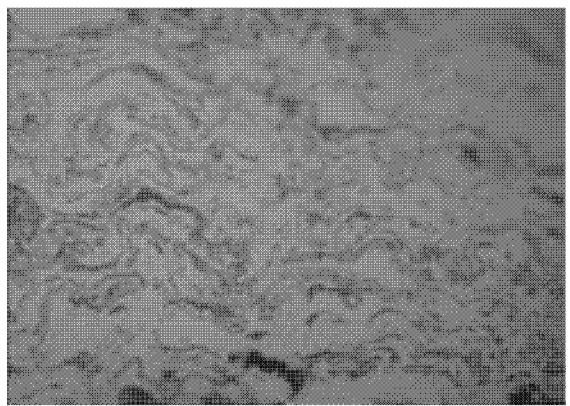

Test Example 4: Microscopic Quality Evaluation of Thermal Sprayed Coating Using Alloy Powder FIG. 7 shows images of cross-sections of thermal sprayed coating samples using Fe-based amorphous alloy powders of Examples 1, 3, 6, and 8 according to the present invention, which are observed with an optical microscope (Leica DM4 M), in which FIGS. 7a to 7d are images of cross-sections of samples of Examples 9, 11, 14, and 16, respectively. FIG. 8 shows images of cross-sections of thermal sprayed coating samples using alloy powders of Comparative Examples 1, 4, and 7, which are observed with the optical microscope, in which FIGS. 8a to 8c are images of cross-sections of samples of Comparative Examples 8, 11, and 14, respectively. As shown in FIG. 7, it was found that the cross sections of the coating of Examples 9, 11, 14, and 16 all exhibited high density.

On the other hand, as shown in FIG. 8, it was found that the cross-sections of the coatings of Comparative Examples 8, 11, and 14 not only contained a number of unmelted particles but also contained a number of gray phases, and layer-layer characteristics were exhibited.

Test Example 5: Evaluation of Hardness of Thermal Sprayed Coating Using Alloy Powder A micro-hardness test for cross-sections of coating samples was performed on the thermal sprayed coatings of Examples 11, 14, and 16, and on the thermal sprayed coatings of Comparative Examples 8, 10, 12, and 14 using an HVS-10 Digital Low Load Vickers Hardness Tester, and the results are shown in Table 3 below.

TABLE 3

| Classification | area | Test value $HV_{0.2}$ | Average $HV_{0.2}$ |
|---|---|---|---|
| Example 11 | Cross-section | 802/754/828/765/710 | 771 |
| Example 14 | Cross-section | 898/834/944/848/789 | 862 |
| Example 16 | Cross-section | 1304/1139/1097/1194/1139 | 1174 |
| Comparative example 8 | Cross-section | 669/756/623/689/683 | 684 |
| Comparative example 10 | Cross-section | 928/862/876/921/802 | 877 |
| Comparative example 12 | Cross-section | 828/848/1012/944/771 | 880 |
| Comparative example 14 | Cross-section | 821/855/808/783/633 | 780 |

As shown in Table 3, in terms of the cross-section, a sample to which the alloy powder of Example 16 was applied was the most excellent in average hardness, and those of the remaining Examples had similar hardness values to the Comparative Examples.

Figure 9:
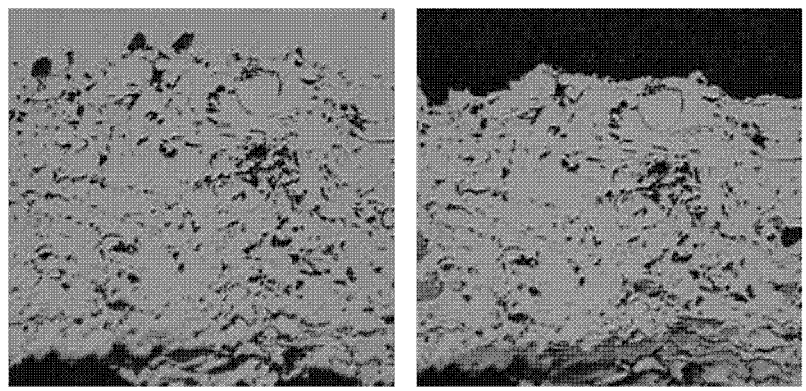
Figure 9:
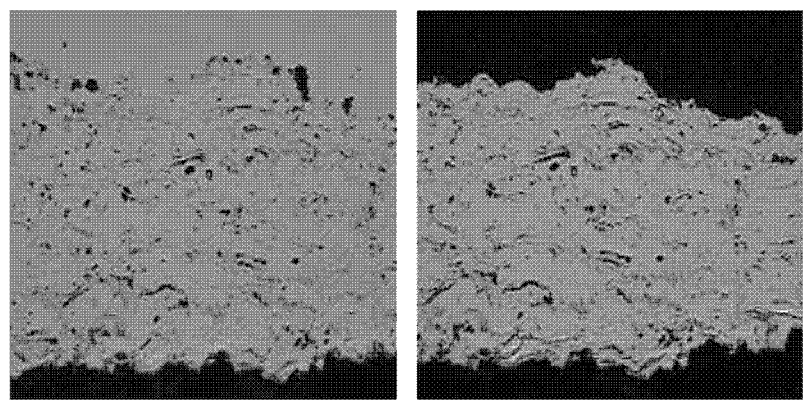
Figure 9:
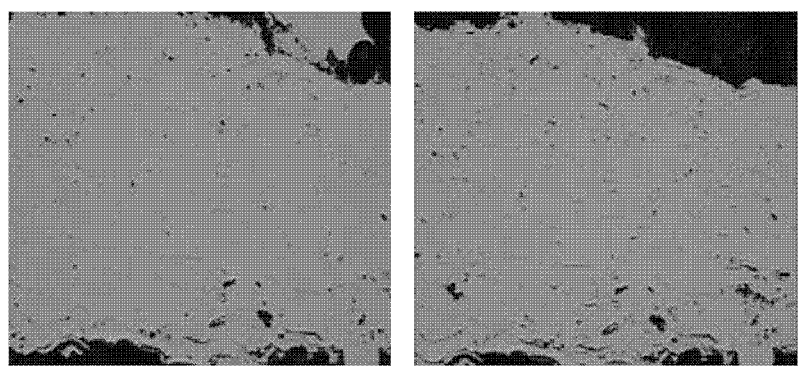
Figure 10:
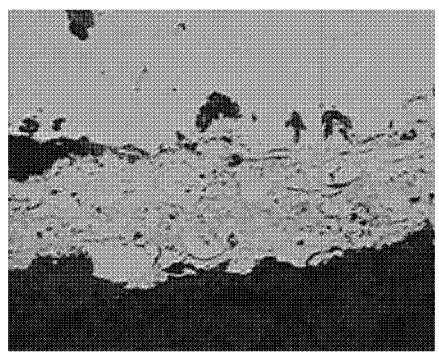
Figure 10:
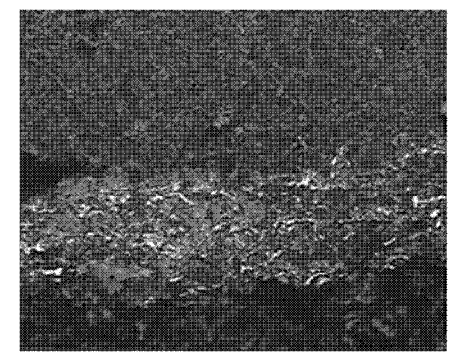
Figure 10:
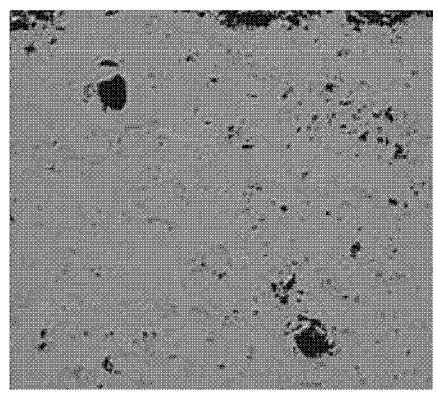
Figure 10:
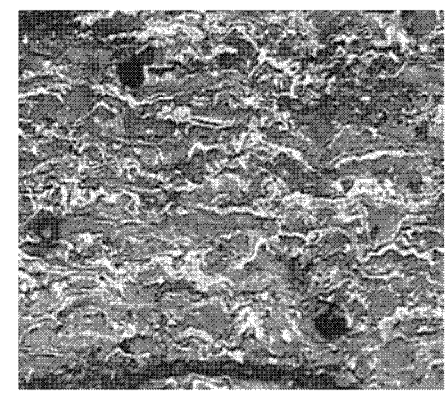
Figure 10:
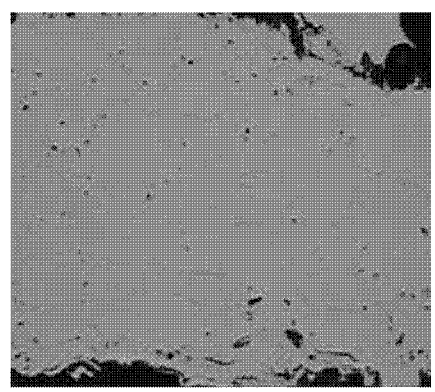
Figure 10:
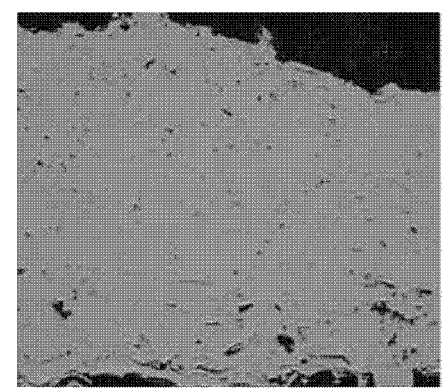

Test Example 6: Evaluation of Corrosion Resistance of Thermal Sprayed Coating Using Alloy Powder FIG. 9 shows images of uncorroded/corroded cross-sections of thermal sprayed coating samples using Fe-based amorphous alloy powders of Examples 2, 4, and 7 according to the present invention, which are observed with the optical microscope, in which FIGS. 9a to 9c are images of samples of Examples 10, 12, and 15, respectively. FIG. 10 shows images of uncorroded/corroded cross-sections of thermal sprayed coating samples using alloy powders of Comparative Examples 2, 4, and 6, which are observed with the optical microscope, in which FIGS. 10a to 10c are images of samples of Comparative Examples 8, 11, and 13, respectively.

In detail, each of the thermal sprayed coating samples was immersed in a solution of sulfuric acid ($H_2SO_4$) at a concentration of 95 to 98% for 5 minutes at room temperature. Then, the cross-sections of an uncorroded coating sample and a corroded coating sample, and the surfaces were observed with an optical microscope (Leica DM4 M). In FIGS. 9 and 10, an uncorroded coating is shown on the left side, and a corroded coating is shown on the right side.

As a result of observation, when the coating samples of Examples 10, 12, and 15 were used, as shown in FIG. 9, there was no difference in appearance before and after immersion in the solution of sulfuric acid, and it was found that the best corrosion resistance was exhibited.

On the other hand, when the coating samples of Comparative Examples 8, 11, and 13 are used, as shown in FIG. 10, the corrosion progressed significantly and very poor corrosion resistance was exhibited.

This is due to the absence or presence of the amorphous structure of a coating. While in the Examples, a coating did not react with strongly acidic corrosive, in the Comparative Examples containing the crystalline structure, a coating reacted with the corrosive to corrode and exhibited poor corrosion resistance.

Test Example 7: Evaluation of Friction of Thermal Sprayed Coating Using Alloy Powder In order to evaluate the friction (friction coefficient), the coating samples of alloy powder prepared in Examples 14 to 16 and Comparative Examples 11 to 14 were subjected to a metal ring-lump test under lubricant conditions to obtain wear width values. In detail, the ring-lump test was performed using MR-H3A high-speed ring-lump wear tester having L-MM 46 resistance friction hydromantic lubricant, under parameters of 50 N, 5 min→100 N, 25 min→1000 N, 55 min.

Figure 11:
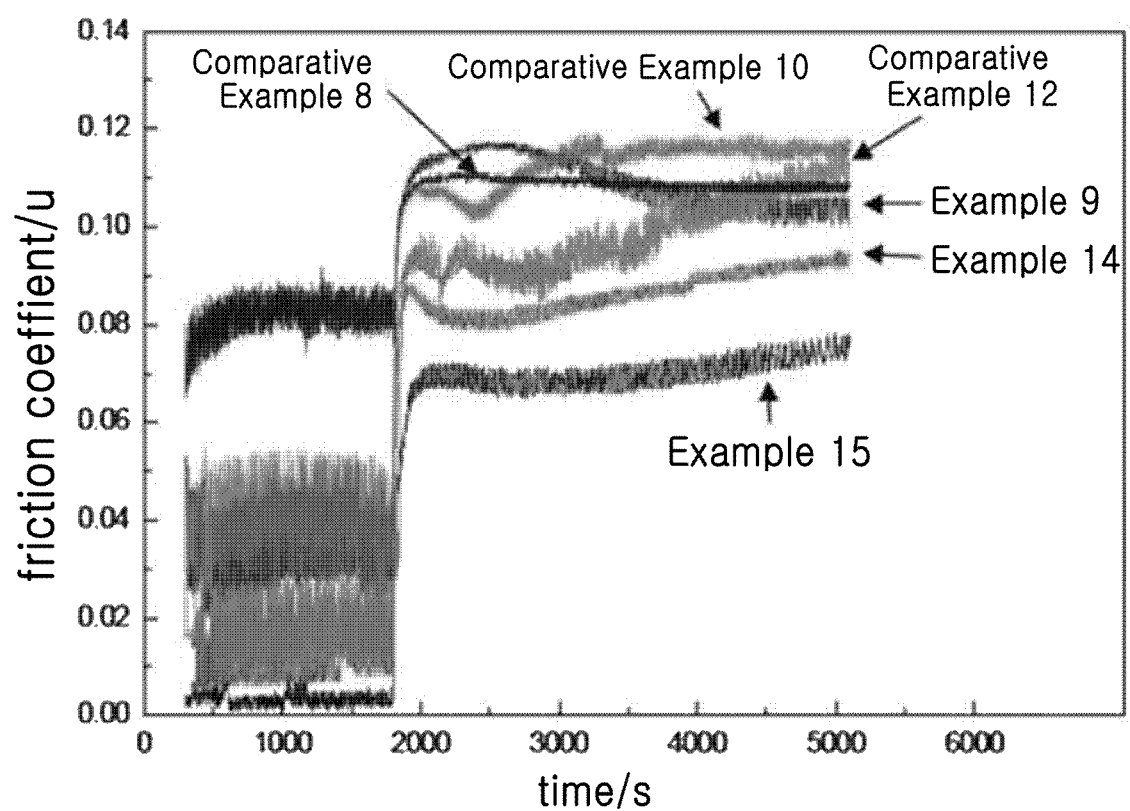
FIG. 11 is a graph showing comparison of friction measurement results between samples of Examples 9, 14, and 15 which are coatings of the Fe-based amorphous alloy powders of Examples 1, 6, and 7 according to the present invention, and samples of Comparative Examples 8, 10, and 12 which are coatings of the alloy powders of Comparative Examples 1, 3, and 5.

FIG. 11 is a graph showing comparison of the wear resistance between samples of Examples 9, 14, and 15 which are coatings of the Fe-based amorphous alloy powders of Examples 1, 6, and 7 according to the present invention, and samples of Comparative Examples 8, 10, and 12 which are coatings of the alloy powders of Comparative Examples 1, 3, and 5. The wear width and friction coefficient can be seen from FIG. 11 and Tables 4 and 5 below (the friction coefficients of the samples under the parameters of 100 N, 25 min and 1000 N, 55 min are shown in Table 4 below, and wear width measurement results are shown in Table 5 below).

TABLE 4

| Classification | 100N, 25 min | | 1000N, 55 min | |
|---|---|---|---|---|
| | Friction coefficient (μm) | Average friction coefficient (μm) | Friction coefficient (μm) | Average friction coefficient (μm) |
| Example 9 | 0.001~0.007 | 0.0044 | 0.040~0.078 | 0.0692 |
| Example 14 | 0.005~0.024 | 0.0127 | 0.007~0.095 | 0.0860 |
| Example 15 | 0.006~0.028 | 0.0135 | 0.007~0.098 | 0.0882 |
| Comparative example 8 | 0.030~0.054 | 0.0419 | 0.101~0.119 | 0.1123 |

TABLE 4-continued

| Classification | 100N, 25 min | | 1000N, 55 min | |
| --- | --- | --- | --- | --- |
| | Friction coefficient (μm) | Average friction coefficient (μm) | Friction coefficient (μm) | Average friction coefficient (μm) |
| Comparative example 10 | 0.008~0.047 | 0.0196 | 0.088~0.116 | 0.0913 |
| Comparative example 12 | 0.065~0.087 | 0.0820 | 0.098~0.111 | 0.1085 |

TABLE 5

| Classification | Width/mm |
| --- | --- |
| Example 9 | 0.79 |
| Example 14 | 0.75 |
| Example 15 | 0.71 |
| Comparative example 8 | 0.98 |
| Comparative example 10 | 1.15 |
| Comparative example 12 | 0.82 |

From the results of Tables 4 and 5, it was found that Examples 9 and 14 had a high friction coefficient on average, and Comparative Examples 8 and 10 had a relatively low friction coefficient. Furthermore, from FIG. 11 and Table 5, it was found that the Examples had a relatively narrow width, and the remaining Comparative Examples had a relatively wide width.

Figure 12:
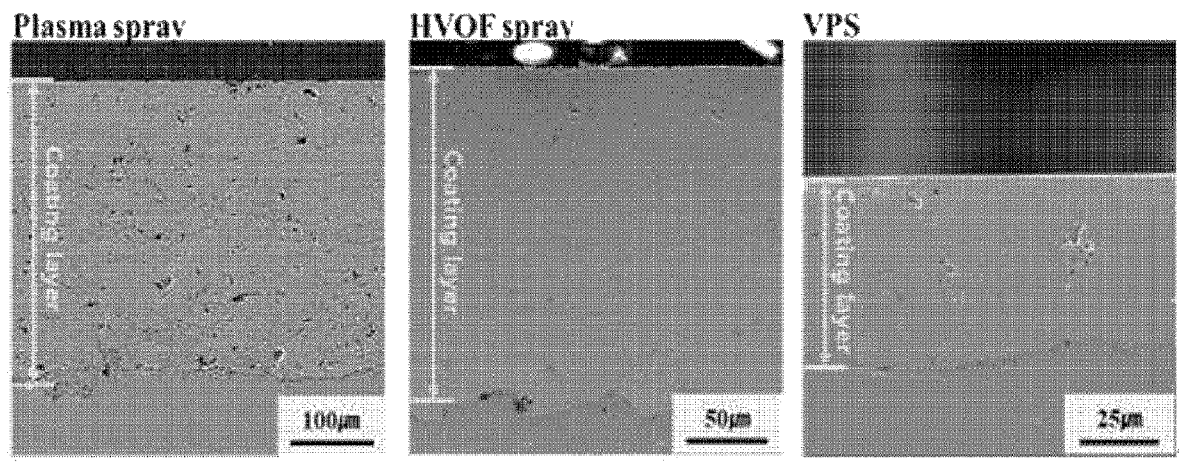
FIG. 12 shows images of cross-sections of a plasma coating sample, an HVOF coating sample, a VPS coating sample using the Fe-based amorphous alloy powder of Example 7 according to the present invention, which are observed with the optical microscope.

Test Example 8: Evaluation of Plasma Coating, HVOF Coating, VPS Coating Using Alloy Powder FIG. 12 shows images of cross-sections of a plasma coating sample (a), an HVOF coating sample (b), a VPS coating sample (c) using an Fe-based amorphous alloy powder of Example 7 according to the present invention, which are observed with the optical microscope (Leica DM4 M). The thickness and porosity can be seen from FIG. 12 and Table 6 below.

TABLE 6

| Classification | (a) Plasma coating | (b) HVOF coating | (c) VPS coating |
| --- | --- | --- | --- |
| Thickness μm | 325.6 | 192.7 | 52.1 |
| Porosity % | 1.8 | 0.9 | 1.2 |

As shown in Table 6, in various coatings to which the Fe-based amorphous alloy powder according to the present invention is applied, it was found that the coating density was high, the quality was excellent, and the porosity was significantly low.

Figure 13:
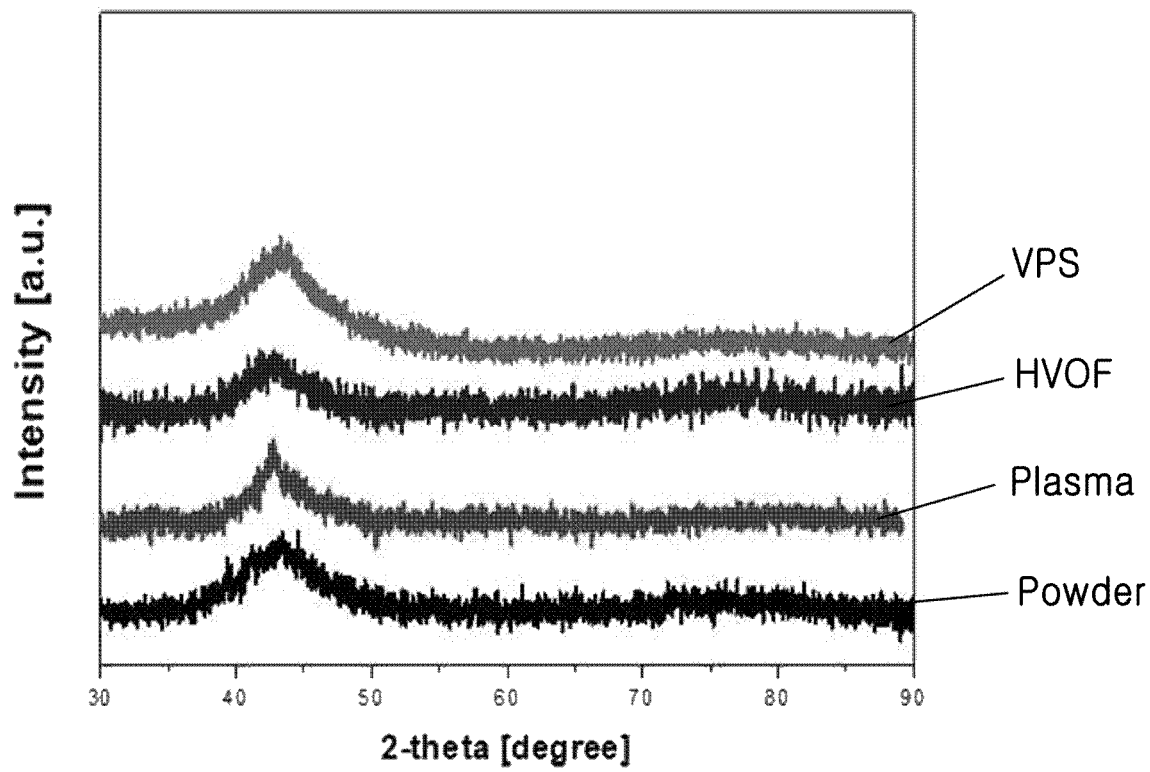
FIG. 13 is an XRD graph of the plasma coating sample, the HVOF coating sample, the VPS coating sample using the Fe-based amorphous alloy powder of Example 7 according to the present invention.

Furthermore, in FIG. 13, an XRD graph of the plasma coating sample (a), the HVOF coating sample (b), the VPS coating sample (c) using the Fe-based amorphous alloy powder of Example 7 according to the present invention is shown.

Referring to FIG. 13, as a result of performing various processes of plasma spraying, HVOF spraying, and VPS spraying, it was found that the amorphous structure of the powder was maintained. For reference, in the case of plasma spraying, alloys that do not have very good amorphous forming ability are known to be crystalline coatings.

Figure 14:
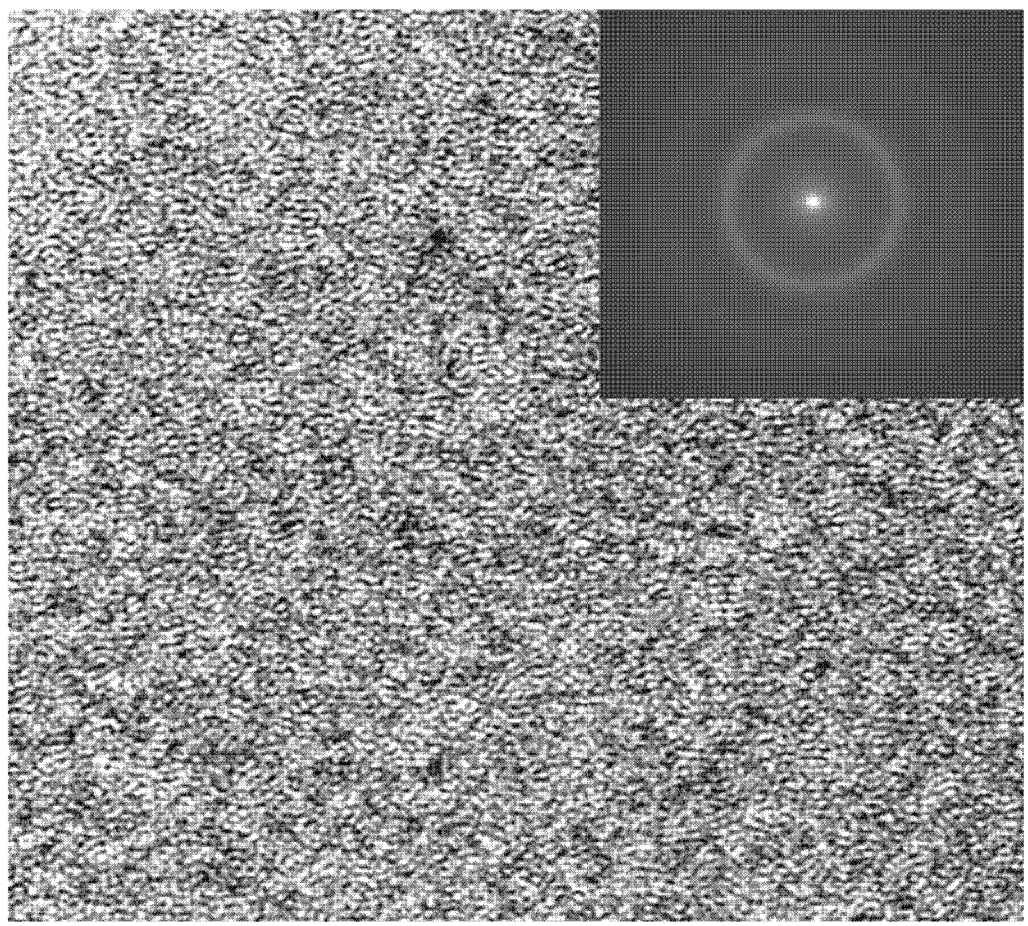
FIG. 14 is a view showing a TEM image of an HVOF coating sample using the Fe-based amorphous alloy powder of Example 7 according to the present invention, and an enlarged view of a partial SAED pattern.
Figure 15:
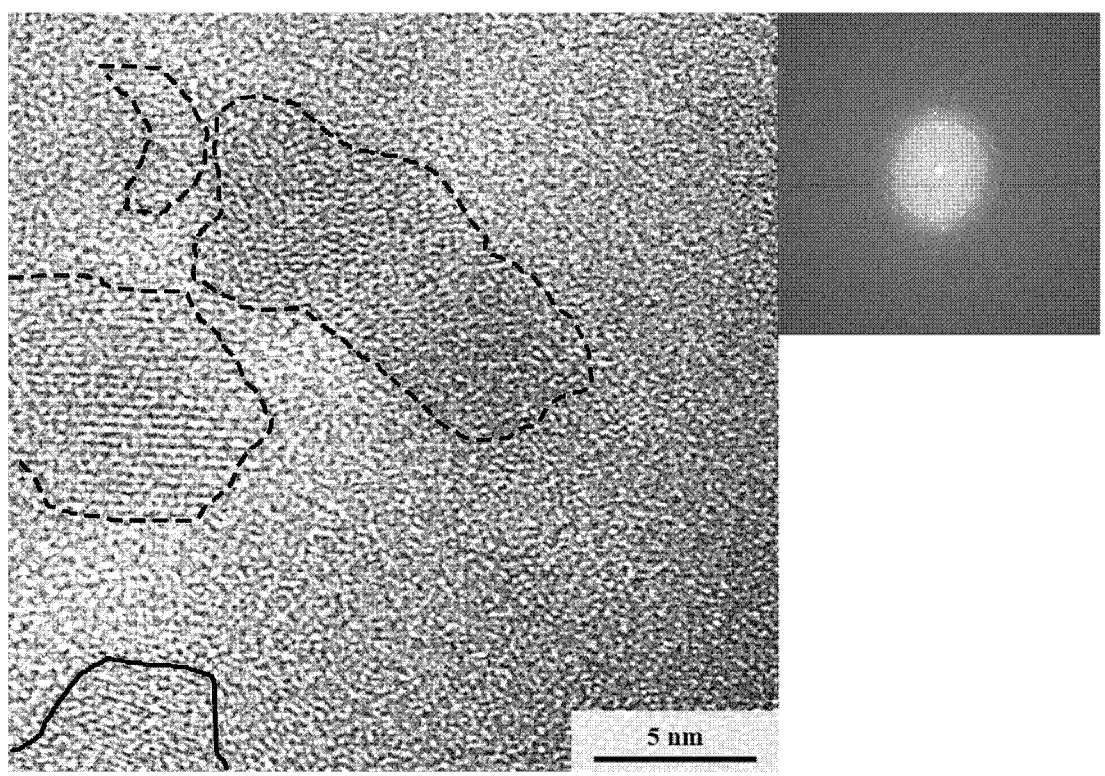
FIG. 15 is a view showing a TEM image of an HVOF coating sample using the Fe-based alloy powder of Comparative Example 7, and an enlarged view of a partial SAED pattern.

Furthermore, in FIG. 14, a TEM image of an HVOF coating sample using the Fe-based amorphous alloy powder of Example 7 according to the present invention, and an enlarged view of a partial SAED pattern are shown. In FIG. 15, a TEM image of an HVOF coating sample using an Fe-based alloy powder of Comparative Example 7, and an enlarged view of a partial SAED pattern are shown.

Referring to FIG. 14, a broad halo ring is present in the SAED pattern. From this, it was found that an amorphous structure was formed even when HVOF spraying was applied using the Fe-based amorphous alloy powder according to the present invention.

On the other hand, as shown in FIG. 15, when preparing an HVOF coating using the Fe-based alloy powder of the comparative example, a dotted pattern is present in the SAED pattern. From this, it was found that a crystalline structure was formed.

Test Example 9: MIM and 3D Printing Manufacturing Example Using Alloy Powder

Figure 16:
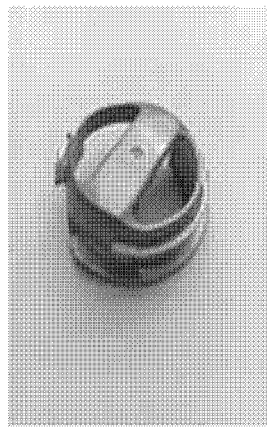
Figure 16:
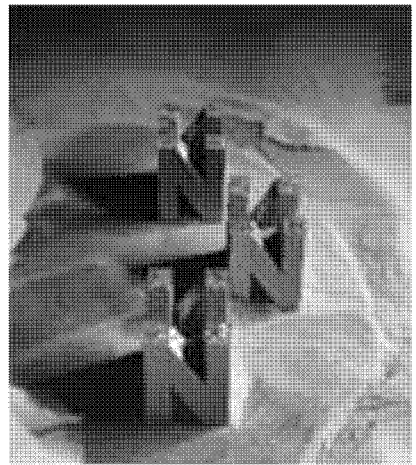
Figure 16:

FIG. 16 shows photographs of an MIM product and a 3D printed product using the Fe-based amorphous alloy powder of Example 7 according to the present invention.

As shown in FIG. 16a, it was possible to manufacture a product in a complex shape by MIM using the Fe-based amorphous alloy powder according to the present invention. As shown in FIG. 16b, it was possible to manufacture a product by 3D printing in a complex shape in which multiple N characters are combined. Particularly, as shown in FIG. 16c, it was possible to manufacture a three-dimensional statue by 3D printing.

Figure 17:
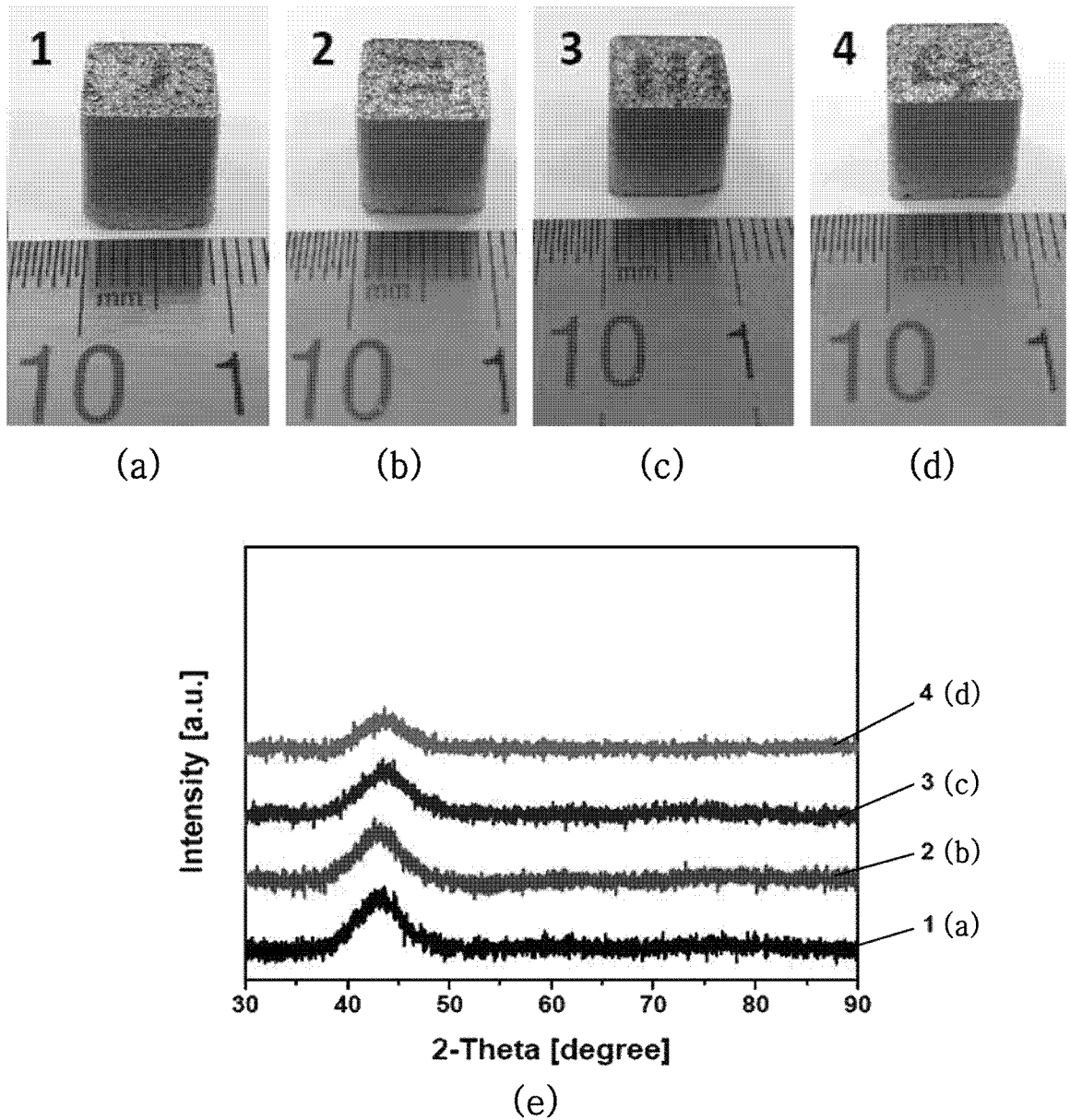
FIG. 17 shows product photographs of a total of four 1 cm³ cubes manufactured by 3D printing using the Fe-based amorphous alloy powder of Example 7 according to the present invention, and an XRD graph of the manufactured cubes.

FIG. 17 shows product photographs of a total of four 1 cm$^3$ cubes manufactured by 3D printing using the Fe-based amorphous alloy powder of Example 7 according to the present invention, and an XRD graph of the manufactured cubes. In detail, an Fe-based bulk metallic glass was obtained by a selective laser melting process, and four cubes were manufactured in accordance with the scanning speed. As described above, when the cubes are manufactured by 3D printing, despite of the fact that there is no separate cooling device and thus the cooling rate at which a molten metal by laser is cooled down is substantially the same as the cooling rate of air cooling (close to a cooling rate of $10^1$ degree/sec), it was found that an amorphous phase was formed (FIG. 17e).

Furthermore, a micro-hardness test for cross-sections of coating samples was performed on the four cubes using an HVS-10 Digital Low Load Vickers Hardness Tester, and the results are shown in Table 7 below.

TABLE 7

| Classification | Test value HV0.2 |
| --- | --- |
| (a) | 1183.9 |
| (b) | 1179.4 |

TABLE 7-continued

| Classification | Test value HV0.2 |
|---|---|
| (c) | 1180.1 |
| (d) | 1184.5 |

As shown in Table 7, it was found that when the Fe-based amorphous alloy powder according to the present invention was used, all of the cubes had excellent hardness.

While the present invention has been particularly shown and described with reference to exemplary embodiments thereof, it will be understood by those of ordinary skill in the art that various changes and modifications may be made therein without departing from the technical idea and scope of the present invention and such changes and modifications belong to the claims of the present invention.

For example, the composition ratios exemplified in the alloy powders according to the embodiments herein are ratios between the compositions when the compositions are used, and it is not intended to exclude the addition of other metals or other process impurities while maintaining the ratios. Accordingly, it should be understood that the present invention includes various modifications, additions and substitutions without departing from the scope and spirit of the invention as disclosed in the accompanying claims.

What is claimed is:

1. A composition for an Fe-based alloy, the composition comprising:
   iron;
   chromium; and
   molybdenum,
   wherein per 100 parts by weight of the iron,
   the chromium is contained in an amount of 25.4 to 55.3 parts by weight,
   the molybdenum is contained in an amount of 35.6 to 84.2 parts by weight,
   at least one of carbon and boron is contained in an amount of 3.4 to 23.7 parts by weight, and
   at least one of additional components selected from the group consisting of tungsten, cobalt, yttrium, manganese, silicon, aluminum, niobium, zirconium, phosphorus, nickel, scandium, and a mixture thereof is contained in an amount of less than 1.125 parts by weight.

2. The composition of claim 1, wherein an alloy that is formed by melting the composition and then cooling the melted composition from a melting point to a glass transition temperature at a cooling rate of 101 to 104 (degree/sec) has an amorphous phase in a proportion of 90 to 100%.

3. The composition of claim 1, wherein the alloy prepared from the composition is one selected from the group consisting of powder, ribbon, sheet, wire, and three-dimensional shaped body.

4. An Fe-based amorphous alloy powder, comprising:
   iron;
   chromium; and
   molybdenum,
   wherein per 100 parts by weight of the iron,
   the chromium is contained in an amount of 25.4 to 55.3 parts by weight,
   the molybdenum is contained in an amount of 35.6 to 84.2 parts by weight,
   at least one of carbon and boron is contained in an amount of 3.4 to 23.7 parts by weight, and
   at least one of additional components selected from the group consisting of tungsten, cobalt, yttrium, manganese, silicon, aluminum, niobium, zirconium, phosphorus, nickel, scandium, and a mixture thereof is contained in an amount of less than 1.125 parts by weight.

5. The Fe-based amorphous alloy powder of claim 4, wherein the alloy powder has an amorphous phase in a proportion of 90 to 100% by volume.

6. The Fe-based amorphous alloy powder of claim 5, wherein the alloy powder is prepared by cooling a composition for an alloy from a melting point to a glass transition temperature at a cooling rate of 101 to 104 (degree/sec).

7. The Fe-based amorphous alloy powder of claim 6, wherein the alloy powder has an average particle size of 10 to 100 μm.

8. The Fe-based amorphous alloy powder of claim 7, wherein the alloy powder is prepared by atomizing.

9. The Fe-based amorphous alloy powder of claim 4, wherein the alloy powder is used as a material in at least one process selected from the group consisting of a coating forming process, a metal powder injection molding (MIM) process, a three-dimensional (3D) printing process, and a powder metallurgy (P/M) process.

10. The Fe-based amorphous alloy powder of claim 4, wherein when a shaped body is manufactured by thermal spraying using the alloy powder, a proportion of an amorphous phase in the shaped body is 90 to 100% by volume.

11. The Fe-based amorphous alloy powder of claim 10, wherein when the thermal spraying is performed using a high velocity oxygen fuel (HVOF) device under the following spraying conditions, the proportion of the amorphous phase in the manufactured shaped body is 95 to 100% by volume,

[Condition]
Gun type: Hybrid, Air cap: 2701, LPG flow: 160 SCFH, LPG pressure: 90 PSI, Oxygen flow: 550 SCFH, Oxygen pressure: 150 PSI, Air flow: 900 SCFH, Air pressure: 100 PSI, Nitrogen flow: 28 SCFH, Nitrogen pressure: 150 PSI, Gun speed: 100 m/min, Gun pitch: 3.0 mm, Feeder rate 45 g/min, Stand-off distance: 250 mm.

12. The Fe-based amorphous alloy powder of claim 11, wherein the shaped body has a Vickers hardness of 700 to 1,200 Hv (0.2), and a friction coefficient of 0.001 to 0.08 μm at a load of 100 N, or 0.06 to 0.12 μm at a load of 1,000 N.

13. The Fe-based amorphous alloy powder of claim 4, wherein proportion (a) of an amorphous phase in an alloy powder and proportion (b) of the amorphous phase in an alloy fulfill an equation of $0.9 \leq b/a \leq 1$, the alloy powder being prepared by melting a composition for an alloy containing iron, chromium, and molybdenum and further containing at least one of carbon and boron and then cooling the melted composition from a melting point to a glass transition temperature at a cooling rate of 101 to 104 (degree/sec), and the alloy being prepared by re-melting the alloy powder and cooling the re-melted alloy powder from a melting point to a glass transition temperature at the cooling rate of 101 to 104 (degree/sec).

14. An Fe-based alloy shaped body that is manufactured by 3D printing using the alloy powder of claim 4,
   wherein a portion of an amorphous phase of an alloy in the shaped body is 90 to 100%.

15. A shaped body that is manufactured by sintering using the alloy powder of claim 4,
   wherein the shaped body contains boride or carbide, or both the boride and carbide, and the boride and carbide are contained in a total amount of 3 to 8 parts by weight per 100 parts by weight of the iron.

* * * * *